(12) United States Patent
Mehta

(10) Patent No.: US 7,595,754 B2
(45) Date of Patent: Sep. 29, 2009

(54) METHODS, SYSTEMS AND APPARATUS FOR INTEGRATED WIRELESS DEVICE LOCATION DETERMINATION

(75) Inventor: Chand Mehta, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/963,889

(22) Filed: Dec. 24, 2007

(65) Prior Publication Data
US 2009/0160711 A1 Jun. 25, 2009

(51) Int. Cl.
G01S 1/02 (2006.01)
G01S 3/02 (2006.01)

(52) U.S. Cl. ............. 342/450; 342/357.06; 342/357.13; 342/457

(58) Field of Classification Search ............ 342/357.02, 342/357.06, 357.08, 357.13, 450, 451, 457; 455/456.2, 456.3, 457
See application file for complete search history.

(56) References Cited

U.S. PATENT DOCUMENTS 7,440,762 B2 * 10/2008 Maloney et al. .......... 455/456.1
2006/0046749 A1 * 3/2006 Pomerantz et al. .......... 455/457
2007/0135136 A1 * 6/2007 Ische ....................... 455/456.1
2008/0246659 A1 * 10/2008 Brenner ................. 342/357.12

* cited by examiner

Primary Examiner—Dao L Phan
(74) Attorney, Agent, or Firm—Fariba Yadegar-Bandari

(57) ABSTRACT

Methods, devices, and systems are presented for integrated wireless device location determination. A method for determining location on a wireless device includes receiving a request for wireless device location and receiving a plurality of wireless network messages. Each message is transmitted from a wireless network edge device associated with one of a plurality of wireless networks. Further included is obtaining location measurement information from the received wireless network messages and obtaining location determining assistance information for each of the wireless networks associated with the received wireless network messages. The method further includes determining more than one wireless device location based on the location measurement information and the location determining assistance information, determining an integrated wireless device location based on the more than one wireless device location, validating and storing the integrated wireless device location. A method for determining wireless device location at a network device is also provided.

75 Claims, 10 Drawing Sheets

METHODS, SYSTEMS AND APPARATUS FOR INTEGRATED WIRELESS DEVICE LOCATION DETERMINATION

BACKGROUND

1. Field

The described aspects relate to wireless communication, and more particularly, to methods, systems, and apparatus of integrated wireless device location determination.

2. Background

Wireless communication devices, such as cellular telephones, portable computers and the like, have rapidly gained in popularity over the past decade. These devices are increasingly becoming multifaceted devices capable of providing a wide-range of functions. For example, today's cellular telephone may also embody computing capabilities, Internet access, electronic mail, text messaging, Global Positioning System (GPS) mapping, digital photographic capability, an audio/MP3 player, video gaming capabilities, video broadcast reception capabilities and the like.

Amongst the myriad of functions listed, mobile communication devices may be equipped with location determination devices and routines, such as GPS sensors, routines or the like, that allows the devices to determine the devices' respective geographic locations/positions at any point in time. Location information is used in navigation systems, which track geographic position with respect to a mapped destination, and may be incorporated in wireless communication devices, such as cellular telephones or the like.

However, Global Navigation Satellite System (GNSS), such as GPS or the like, may have limitations in terms of their ability to obtain a location, commonly referred to as a "fix." For instance, a location-determining device may need to receive satellite signals from the associated satellites. The GPS location determination can be impeded, or at times impossible, if the wireless device is indoors, or surrounded by tall buildings, such as a dense urban environment or the like.

Other methods of wireless location determination may have been developed to augment GPS location determination, provide location determination in instances in which GPS location determination is unavailable, or provide location determination in the wireless devices not equipped with GPS capability. Such methods may rely on determining or estimating the position of other wireless network edge devices in communication with the wireless device, such as cellular network base stations, Wireless Local Area Network (WLAN) access points, such as wireless fidelity (Wi-Fi) access point, Worldwide Interoperability for Microwave Access (WiMAX) access points, and the like. Such methods implement positioning techniques to determine a location for the wireless device based on the finite or estimated location of the wireless network edge devices. With the increasing prevalence of WLAN access points, referred to as Wi-Fi hot spots or WiMAX hot spots, the ability to determine a location based on the estimated location of Wi-Fi access points has increased.

Nonetheless, the applications that augment GPS location determination with other wireless network solutions are limited to software-only solutions. For example, software-only positioning systems may exist that leverage a nationwide database of known Wi-Fi access points to calculate the precise location of any Wi-Fi enabled device. Similarly, peer-to-peer software-only wireless positioning systems may exist that triangulate signals transmitted from Wi-Fi access points and Cellular towers to help the users find their way in most major metropolitan areas worldwide. These software-only solutions tend to be inefficient in terms of providing location determination because position determinations occur sequentially significantly increasing the processing times. Additionally, such software-only solutions do not necessarily provide the most accurate location determination.

Therefore, a need exists to develop methods, systems, and apparatus for integrating satellite-based location determination, such as GPS, with other non-satellite wireless network location determination methods, such as Wi-Fi, WiMAX, Global System for Mobile Communication (GSM), and Code Division Multiple Access (CDMA) methods. The desired methods, systems, and apparatus should provide greater efficiency than current software-only based systems and provide for a greater level of reliability and accuracy.

SUMMARY

The following presents a simplified summary of one or more aspects in order to provide a basic understanding of such aspects. The subject summary is not an extensive overview of all contemplated aspects, and is intended to neither identify key or critical elements of all aspects nor delineate the scope of any or all aspects. The sole purpose of the subject Summary is to present some concepts of one or more aspects in a simplified form as a prelude to the more detailed description that is presented infra.

In one aspect, a method for determining location on a wireless device is defined. The method includes receiving a request for wireless device location and receiving a plurality of wireless network messages, each message transmitted from a wireless network edge device that is associated with one of a plurality of wireless networks. The method further includes obtaining location measurement information from the received wireless network messages and obtaining location determining assistance information for each of the wireless networks associated with the received wireless network messages. The method also includes determining more than one wireless device location based on the location measurement information and the location determining assistance information, determining an integrated wireless device location based on the more than one wireless device location, validating the integrated wireless device location and storing the integrated wireless device location.

In one aspect of the method receiving a plurality of wireless network messages further includes passively listening to receive all messages transmitted from wireless network edge devices that are within a reception range of the wireless device and having a signal strength detectable by the wireless communication device. Passively listening to receive all of the messages may further include tuning a Software Defined Radio (SDR) to receive all wireless network messages transmitted from wireless network edge devices that are within a reception range of the wireless device.

In some aspects, determining more than one wireless device location may include determining a location for each of the networks associated with the received wireless network messages. In other aspects, one or more of the wireless device locations may be determined by combining measurements from more than one network.

In some aspects of the method, obtaining location measurement information from the received one or more wireless network messages further includes obtaining location measurement information such as, but not limited to, the access point Media Access Control (MAC) address, a wireless network System Identification (SID), power measurement information, Radio Frequency (RF) characteristics, MultiMedia Card (MMC) device ID, Code Division Multiple Access Subscriber Identification (CDMA SID), base station ID, frequency band and the like. In certain aspects, obtaining location determining assistance information may include accessing a database stored in a memory of the wireless device to obtain location determining information or, alternatively, in other aspects, obtaining location determining assistance information includes requesting location determining assistance information a database stored in a memory of a device located across a wireless network from the wireless device and receiving the location determination assistance information in response to the request.

In yet other aspects of the method, determining an integrated wireless device location may further include determining an integrated wireless device location based on at least one predetermined determination method, such as, but not limited to, averaging the wireless device locations, weighted averaging the wireless device locations, defining an overlapping area for the wireless device locations and the like.

In certain aspects of the method, validating the integrated wireless device location further comprises comparing the integrated wireless device location to at least one of a group of a natural structure topology database and/or a man-made structure topology database, such as an urban landmark database, to reduce altitude uncertainties.

Additional aspects of the method include receiving satellite signals associated with a Global Navigation Satellite System (GNSS), obtaining GNSS location determining information for the GNSS and determine a GNSS wireless device location based on the received satellite signals and the GNSS location determining information. The GNSS may include, but is not limited to Global Positioning System (GPS), Galileo, GLONASS, and the like. In such methods, determining an integrated wireless device location may further include determining an integrated wireless device location based on the one or more wireless device locations based on the wireless network data and the GNSS wireless device location.

In some aspects, receiving a plurality of wireless network messages may further include receiving a plurality of wireless network messages, each message transmitted from a surrounding network edge device or a serving network edge device that is associated with a surrounding wireless network or a serving wireless network. As used herein, the term "surrounding wireless networks" refers to non-attached wireless networks from which the wireless device is capable of receiving wireless network messages. Conversely, the term "serving wireless network" is used herein to refer to the active or attached wireless networks that are currently being used by the wireless device. For example, if the wireless device is currently communicating on the Global System for Mobile (GSM) communications network, GSM would be the serving network and all other wireless networks, for example CDMA communication network, a Wi-Fi communication network or the like would be the surrounding wireless networks. In one or more alternate aspects, the wireless device may be actively communicating with more than one serving network. In the instances in which more than one serving network is active, one of the networks may be designated as the primary serving network, for example, the cellular network and the other serving networks may be designated as the secondary serving networks. In such methods, determining an integrated wireless device location may further include determining an integrated wireless device location based on one or more surrounding network wireless device locations and/or one or more the serving network wireless device locations. In yet another aspect of the method, the wireless device may integrate the surrounding network wireless device locations, the GNSS-based wireless device location and/or the serving network wireless device locations.

In further aspects, the method may include storing the integrated wireless device location as a tagged wireless device location and/or storing an estimated location of one or more wireless network edge devices based on the integrated wireless device location and the location measurement information associated with the wireless network edge devices. Storing of the tagged wireless device location and the estimated location of the wireless network edge devices provides for a self-learning database that provides greater efficiency for subsequent integrated location fixes.

A related aspect is defined by at least one processor configured to determine location at a wireless device. The processor includes a first module for receiving a request for wireless device location and a second module for receiving one or more network messages transmitted from one or more network edge devices each associated with a wireless network. The processor additionally includes a third module for obtaining location measurement information from the received one or more wireless network messages and a fourth module for obtaining location determining assistance information for each of the wireless networks associated with the received one or more wireless network messages. The processor also includes a fifth module for determining more than one wireless device location based on the location measurement information and the location determining assistance information, a sixth module for determining an integrated wireless device location based on the more than one wireless device location, a seventh module for validating the integrated position and an eighth module for storing the integrated wireless device location.

Another related aspect is defined by a computer program product. The computer program product includes a computer-readable medium. The medium includes at least one instruction for causing a computer to receive a request for wireless device location and at least one instruction for causing a computer to receive a plurality of wireless network messages, each transmitted from a wireless network edge device that is associated with one of a plurality of wireless networks. The medium additionally includes at least one instruction for causing a computer to obtain location measurement information from the received wireless network messages and at least one instruction for causing a computer to obtain location determining assistance information for each of the wireless networks associated with the received wireless network messages. The medium also includes at least one instruction for causing a computer to determine more than one wireless device location based on the location measurement information and the location determining assistance information, at least one instruction for causing a computer to determine an integrated wireless device location based on the more than one wireless device location, at least one instruction for causing a computer to validate the integrated position and at least one instruction for storing the integrated wireless device location.

Yet another related aspect is provided for by an apparatus. The apparatus includes means for receiving a request for wireless device location, means for receiving a plurality of wireless network messages, each message transmitted from a network edge device that is associated with one of a plurality of wireless networks and means for obtaining location measurement information from the received wireless network messages. The apparatus additionally includes means for obtaining location determining assistance information for each of the wireless networks associated with the received wireless network messages and means for determining more than one wireless device location based on the location measurement information and the location determining assistance information. The apparatus also includes means for determining an integrated wireless device location based on the more than one wireless device location, means for validating the integrated wireless device location, and means for storing the integrated wireless device location.

A further aspect is defined by a wireless device. The device includes a computer platform including a processor and a memory. The device also includes a location integrating device executable by the processor and including a wireless network location determiner operable to receive wireless network messages from one or more wireless network edge devices, obtain wireless network edge device location measurement information from the transmitted messages, obtain wireless network location determining assistance information for each of the wireless networks and determine one or more wireless device locations based on the wireless network location measurement information and the wireless network location determining assistance information. The location integrating device additionally includes a GNSS location determiner operable to receive satellite signals, obtain GNSS location measurement information from the satellite signals, obtain GNSS location determining assistance information and determine a GNSS-based wireless device location based on the GNSS location measurement information and the GNSS location determining assistance information. The location integrating device also includes a location integrator operable for determining an integrated wireless device location based on the one or more wireless device locations for each of the wireless networks and the GNSS-based wireless device location.

In one aspect of the wireless device, the wireless network location determiner is further operable to passively listen to receive all messages transmitted from one or more surrounding network edge devices that are within a reception range of the wireless device and have signal strength detectable by the wireless device. In this regard, the location integrating device may further include a Software Defined Radio (SDR) operable to be tuned to receive all wireless network messages transmitted from one or more wireless network edge devices that are within a reception range of the wireless device.

In another aspect of the wireless device, the wireless network location determiner is further operable to receive wireless network messages from surrounding network edge devices and/or serving network edge devices, obtain surrounding network edge device and/or serving network edge device location measurement information from the transmitted messages, obtain surrounding network and/or serving network location determining assistance information for the surrounding and/or serving network and determine wireless device locations based on the surrounding network and/or serving network location measurement information and the surrounding network and/or serving network location determining assistance information. In such aspects, the location integrator is further operable to determine an integrated location based on the one or more wireless device locations associated with the serving and surrounding networks and the GNSS-based wireless device location.

In certain aspects of the wireless device the wireless network location determiner is further operable to access a database stored in a memory of the wireless device to obtain the wireless network location determining information and, alternatively, in other aspects the wireless network location determiner module is further operable to request the location determining assistance information a database stored in a memory of a device located across a wireless network from the wireless device and receive the location determination assistance information in response to the request.

In one aspect of the wireless device, the location integrator is further operable to determine an integrated wireless device location based on at least one predetermined determination method, such as, but not limited to, averaging the wireless device locations, weighted averaging the wireless device location and defining an overlapping area for the wireless device locations.

In yet further aspects, the wireless device may include a location validator operable to validate the integrated wireless device location. As such, in certain aspects, the location validator may compare the integrated wireless device location to at least one of a group of a natural structure topology database and a man-made structure topology database to reduce altitude uncertainties.

In further aspects of the wireless device, the memory may further include a wireless device tagging database operable to receive and store the integrated wireless device location. In other aspects, the location determining device may further include a self-learning location estimator operable to estimate the location of one or more wireless network edge devices based on the integrated wireless device location and the location measurement information associated with the wireless network edge devices. As such, in further aspects the memory may include a self-learning database operable to receive and store the estimated location of one or more wireless network edge devices.

An aspect is additionally defined by a method for determining wireless device location at a network device. The method includes receiving a request for wireless device location including location measurement information associated with a plurality of wireless network edge devices and obtaining location determining assistance information for each of the wireless networks associated with the wireless network edge devices. The method additionally includes determining more than one wireless device location based on the location measurement information and the location determining assistance information, determining an integrated wireless device location based on the more than one wireless device location and validating the integrated wireless device location.

In some aspects, determining more than one wireless device location may include determining a location for each of the networks associated with the received wireless network messages. In other aspects, one or more of the wireless device locations may be determined by combining measurements from more than one network.

In one aspect of the method, determining the integrated wireless device location further includes determining an integrated wireless device location based on at least one predetermined determination method, such as, but not limited to, averaging the wireless device locations, weighted averaging the wireless device locations and defining an overlapping area for the wireless device locations.

In certain aspects of the method validating the integrated wireless device location may further include comparing the integrated wireless device location to at least one of a group of a natural structure topology database and a man-made structure topology database to reduce altitude uncertainties.

In further aspects of the method receiving a request for wireless device location further comprises receiving a request for wireless device location including location measurement information associated with GNSS signals. In such aspects the method may further include obtaining location determining assistance information for the GNSS and determining a GNSS wireless device location based on the GNSS satellite signals and the GNSS location determining assistance information. Additionally, in such aspects, determining an integrated wireless device location may further include determining an integrated wireless device location based on the one or more wireless device locations associated with the wireless network messages and the GNSS wireless device location.

In further aspects of the method receiving a request for wireless device location further comprises receiving a request for wireless device location including location measurement information associated with a surrounding and/or serving wireless network edge devices. In such aspects the method may further include obtaining location determining assistance information for the surrounding and/or serving network and determining a wireless device location based on the serving network edge device and/or surrounding network edge device location measurement information and the surrounding network and/or serving network location determining assistance information. Additionally, in such aspects, determining an integrated wireless device location may further include determining an integrated wireless device location based on the wireless device locations associated with the serving and/or surrounding network and the GNSS wireless device location.

Other aspects of the method may include storing the integrated wireless device location as a tagged wireless device location and/or storing an estimated location of one or more wireless network edge devices based on the integrated wireless device location and the location measurement information associated with the wireless network edge devices.

A related aspect is provided for by at least one processor configured to determine wireless device location at a network device. The processor includes a first module for receiving a request for wireless device location including location measurement information associated with a plurality of wireless network edge devices and a second module for obtaining location determining assistance information for each of the wireless networks associated with the wireless network edge devices. The processor additionally includes a third module for determining more than one wireless device location based on the location measurement information and the location determining assistance information, a fourth module for determining an integrated wireless device location based on the more than one wireless device location, a fifth module for validating the integrated wireless device location and a sixth module for storing the integrated wireless device location.

Another related aspect is provided for by a computer program product including a computer-readable medium. The medium includes at least one instruction for causing a computer to receive a request for wireless device location including location measurement information associated with a plurality of wireless network edge devices, at least one instruction for causing a computer to obtain location determining assistance information for each of the wireless networks associated with the wireless network edge devices and at least one instruction for causing a computer to determine more than one wireless device location based on the location measurement information and the location determining assistance information. The medium additionally includes at least one instruction for causing a computer to determine an integrated wireless device location based on the more than one wireless device location, at least one instruction for causing a computer to validate the integrated wireless device location and at least one instruction for causing the computer to store the integrated wireless device location.

Yet another related aspect is defined by an apparatus that includes means for receiving a request for wireless device location including location measurement information associated with a plurality of wireless network edge devices, means for obtaining location determining assistance information for each of the wireless networks associated with the wireless network edge devices and means for determining more than one wireless device location based on the location measurement information and the location determining assistance information. The apparatus additionally includes means for determining an integrated wireless device location based on the more than one wireless device location, means for validating the integrated wireless device location and means for storing the integrated wireless device location An aspect also is provided for by a network device. The network device includes a computer platform including a processor and a memory. The network device additionally includes a protocol handler stored in the memory and executable by the processor, wherein the protocol handler is operable to receive a request for wireless device location and obtain, from the request, location measurement information associated with one or more wireless network edge devices and GNSS satellite signals. The network device also includes a location determining assistance information database stored in the memory and operable to store location determining assistance information associated with wireless networks and GNSSs and a location determining module stored in the memory and executable by processor, wherein the location determining module is operable to determine more than one wireless device location and a GNSS-based wireless device location based on the location measurement information and the location determining assistance information. The network device also includes a location integration module stored in the memory and executable by the processor, wherein the location integration module is operable to determine an integrated wireless device location based on at least two of the one or more wireless device locations and the GNSS-based wireless device location.

In one aspect of the network device, the location integration module is further operable to determine an integrated wireless device location based on at least one predetermined determination method, such as, but not limited to, averaging the wireless device location and the GNSS-based wireless device location, weighted averaging the wireless device location and the GNSS-based wireless device location and defining an overlapping area for the wireless device locations and the GNSS-based wireless device location.

In another aspect the wireless device may include a location validation module stored in the memory and executable by the processor, wherein the location validation module is operable to validate the integrated wireless device location. As such, the location validation module may compare the integrated wireless device location to at least one of a group of a natural structure topology database and a man-made structure topology database to reduce altitude uncertainties.

In yet another aspect of the network device, the protocol handler is further operable to receive a request for wireless device location and obtain, from the request, location measurement information associated with one or more surrounding network edge devices and/or one or more serving network edge devices. In such aspects, the location determining assistance information database may be further operable to store location determining assistance information for the surrounding network and/or the serving network and the location determining module is further operable to determine wireless device locations based on a surrounding network edge device and/or a serving network edge device location measurement information and the location determining assistance information for the surrounding network and/or the serving network. Additionally, the location integration module may be further operable to determine an integrated wireless device location based on the wireless device locations associated with the serving and/or surrounding networks and the GNSS-based wireless device location.

In another aspect, the network device may include a self-learning module stored in the memory and executable by the processor, wherein the self-learning module is operable to estimate the location of one or more wireless network edge devices based on the integrated wireless device location and the location measurements associated with the wireless network edge devices and store the estimated location of the wireless network edge devices. In addition, the self-learning module may be operable to combine the measurement and location information from various wireless devices to provide even greater accuracy to the estimated edge device location.

Thus, one or more of the present aspects provide for methods, devices, and systems for integrated wireless device location determination. In particular, one or more aspects provide for integrating wireless network location determination, such as Wi-Fi, WiMAX, CDMA, GSM, and the like, and GNSS location determination, such as GPS and the like. While integration of the various location determination methods provides for more accurate location determination, the systems, methods, and apparatus herein disclosed further allow location (i.e., position) to be determined in instances in which one or more of the location determination methods are unavailable. One or more of the specific aspects provide for a hardware-based solution that combines the GPS and Wi-Fi/WiMAX functionality on a wireless device semiconductor device to provide greater efficiency and speed in determining the integrated position. Additionally, efficiency is realized by providing for a self-learning system that estimates and continuously refines a location for wireless network edge devices, such as cellular network base stations, Wi-Fi/WiMAX access points and the like. In one example, accuracy of the integrated location determination is provided for by a validation process that serves to eliminate altitude uncertainties from the resulting integrated location.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

Figure 1:
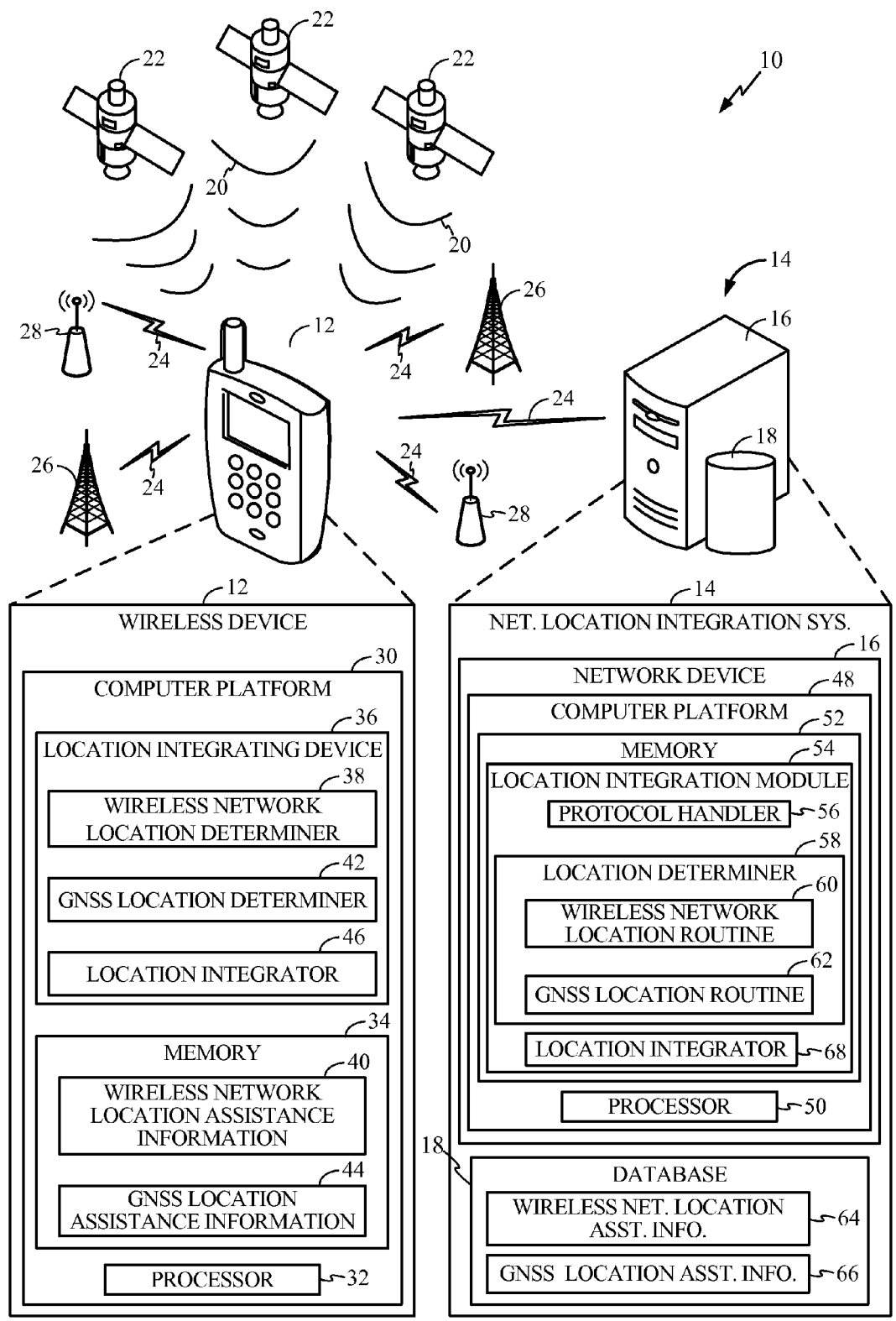
FIG. 1 is a block diagram of a system for integrating wireless device location determination, according to an aspect.

The present devices, apparatus, methods, computer-readable media, and processors now will be described in more detailed hereinafter with reference to the accompanying drawings, in which aspects of the invention are shown. The devices, apparatus, methods, computer-readable media and processors may, however, be embodied in many different forms and should not be construed as limited to the aspects set forth herein; rather, these aspects are provided so that the subject disclosure will be thorough and complete, and will convey the scope of the invention to those skilled in the art. Like numbers refer to like elements throughout.

The various aspects described herein are in connection with a wireless communication device. A wireless communication device can also be called a subscriber station, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Thus, present aspects provide systems, methods, and apparatus for integrated wireless device location determination. In particular, aspects are described for integrating cellular network location determination (e.g., CDMA, GSM networks, etc.), WLAN location determination (e.g., Wi-Fi), WiMAX location determination, and GNSS location determination (e.g., GPS) and combinations of the various methods or the like. In addition to providing more accurate location determination, integration of the various location determination methods further provides for determination of location (i.e., position) in instances in which one or more of the location determination methods are unavailable. For example, GNSS location determination can be unavailable or limited in instances in which the associated wireless device experiences difficulty receiving satellite signals (e.g., indoors, dense urban areas populated with numerous high-rise buildings, etc.). Nevertheless, according to one aspect, the overall location determination integration process may occur at the wireless device, at a network entity or via a combination of both the wireless device and a network entity.

In one aspect of the described systems, methods and apparatus, a hardware-based solution at the wireless device level is defined, which can provide a more streamlined and efficient location determination process, in that, individual location determinations may be performed in parallel and, thus, integrated location determination can be performed faster. In addition, the systems, methods, and apparatus provide for a self-learning feature that allows for the location of network edge devices, such as wireless access points, base stations and the like, to be estimated using location measurement information of the network edge device and the determined location of the wireless device. This self-learning feature thus provides for continual accuracy refinement of the estimated location of the network edge devices based on continual location fixes relying on the network edge device for positional data. In turn, self-learning of network edge device location provides greater efficiency to the wireless device location determination process because the process can subsequently rely on the accuracy of the estimated location of the network edge devices in determining a wireless device location.

Moreover, in one aspect, the integrated location determination methods, systems, and apparatus provide for the wireless device to implement only a portion of the protocol stack in determining location. The necessary portion of the protocol stack is required to passively listen, otherwise referred to as "sniff," for messages transmitted by network edge devices, such as wireless access points and the like, and to decode the wireless network messages. Information included in the wireless network messages, such as an access point Media Access Control (MAC) address, wireless network System ID (SID), Multimedia Card (MMC) device ID, Radio Frequency (RF) characteristics, CDMA System Identification (SID), base station ID, frequency band transmitted, power measurements and the like are used to determine the position of the wireless device to the network edge device and, subsequently the location of the wireless device.

In one aspect, the wireless device may implement a Software Defined Radio (SDR), which can be tuned to any frequency band. The SDR can further receive modulation across a large frequency spectrum by means of programmable hardware controlled by software. Thus, in one implementation, the SDR enables the various aspects of the present invention to limit the protocol stack to only those layers necessary to receive wireless network messages. Additionally, mechanisms such as SDR and the like provide for the wireless device to receive wireless network messages from any and/or all surrounding wireless networks within a frequency range or ranges supported by the wireless device. As such, one or more of the present aspects can provide location determination for all the wireless networks and/or network edge devices from which wireless network messages are received.

Additionally, the systems, methods, and apparatus herein described provide for validation of the integrated location determination. In particular, one implementation provides for validation of the altitude or elevation aspect of the determined location by comparing the determined location to a natural structure database, such as a topographical database and/or a man-made structure database, such as an urban building database so as to reduce altitude uncertainties. Validation of the location may especially be relevant if the wireless device is located indoors, and moreover, located on a specific floor of a building.

FIG. 1 provides a block diagram illustration of a system 10 for integrating wireless device location determination, according to one aspect. The system 10 includes a wireless device 12 and a network location integration system 14, which characteristically includes one or more network devices 16, such as servers, and one or more databases 18. As will be appreciated by those skilled in the art, any of the databases 18 herein disclosed may be included within any one of the network devices 16 or the databases may be self-contained databases. It will also be appreciated based on the following disclosure that one or more aspects of the system 10 may be configured to allow for wireless device-based location integration or for network-based location integration. In one implementation, in which the location integration is wireless device-based, the wireless device may rely on the network for certain aspects of the location determination process, such as GNSS assistance information depending on the mode of location determination implemented and/or wireless network location assistance information.

The wireless device 12 is configured to receive satellite signals 20 from the plurality of satellites 22 associated with a specific GNSS system, such as GPS, GLONASS, Galileo, or the like. The wireless device is additionally configured to receive transmitted messages across wireless network 24 from the plurality of base stations 26 associated with wireless networks, such as GSM, CDMA and the like, and from the plurality of wireless access points 28, such as Wi-Fi hot spots and the like.

The wireless device 12 includes a computer platform 30 having at least one processor 32 and a memory 34. Additionally, the wireless device 12 includes a location integrating device 36 that is operable to integrate the various location determinations performed on the wireless device 12 and/or accessible to the wireless device 12. The location integrating device 36 includes a wireless network location determiner 38 that is operable to determine one or more wireless device location. In this regard, wireless network location determiner 38 is operable to receive transmitted messages from a plurality of wireless network edge devices 26 and 28. In certain aspect, the determiner 38 may implement an RF tuner, such as an SDR to tune or receive all of the messages transmitted from wireless network edge devices within the frequency range or ranges supported by the wireless device 12. The use of an RF tuner, such an SDR allows the wireless device 12 to implement only a portion of the protocol stack as the wireless device 12 passively listens (i.e., sniffs) for transmitted messages.

The wireless network location determiner 38 is additionally operable to obtain wireless network edge device location information from the transmitted messages. The wireless network edge device location information obtained from the transmitted messages may include, but is not limited to, the access point MAC address, the SID, the power measurements of the transmitted and received message, MMC device ID, RF characteristics, CDMA SID, base station ID, frequency band and the like. Additionally, the wireless network location determiner 38 is operable to obtain wireless network location assistance information for each of the wireless networks associated with the received messages. The wireless network assistance information 40 may be stored locally in memory 34 or the wireless network location determiner 38 may be required to communicate with a network entity to retrieve the requisite wireless network assistance information 40. The wireless network location determiner 38 is also operable to determine a wireless device location, commonly referred to as a "fix," based on the wireless network edge device location information and the wireless network location assistance information. Each location determination may be a result of using measurement information from one particular wireless network or a location determination may be a result of using measurement information from more than one wireless network. For example, a location determination may be the result of measurement information from two Wi-Fi access points or a location determination may be the result of measurement information from a CDMA base station and a Wi-Fi access point.

The location integrating device 36 can additionally include a GNSS location determiner 42 that is operable to determine a GNSS-based wireless device location. In this regard, the GNSS location determiner 42 is operable to receive satellite signals 20 transmitted from GNSS satellites 20 and obtain GNSS location measurement information from the satellite signals. Additionally, the GNSS location determiner 42 is operable to obtain GNSS location determining assistance information. Depending on the mode of GNSS location determination, the GNSS location determiner 42 may obtain the GNSS-based assistance information 44 locally from memory 34 or the GNSS-based location determiner 42 may be required to communicate with a network entity to retrieve the requisite GNSS-based assistance information 44. The GNSS location determiner 42 is additionally operable to determine a GNSS-based wireless device location based on the GNSS location measurement information and the GNSS-based assistance information 44.

The location integrating device 36 additionally includes a location integrator 46 that is operable to integrate all of the determined wireless device locations, such as the wireless device location and the GNSS-based wireless device location. The location integrator 46 may implement a predetermined integration method/routine to determine the overall integrated wireless device location. Integration routines may include, but are not limited to, averaging all the determined locations, weighted averaging of all the determined locations, or defining an overlapping geometric area that encompasses two or more of the determined locations. In one example, weighted averaging method may provide higher weights to more accurate or more reliable location determination method to determine the integrated location of the wireless device. Alternatively, weighted averaging method may provide lower weights to less accurate or less reliable location determination method to determine the integrated location of the wireless device."

In certain aspects, the system 10 provides for wireless device location determinations and the integration of the location determinations to occur at the network level. Thus, the system 10 may include a network location integration system 14 that includes one or more network devices 16 and one or more databases 18.

The network device 16 of network location integration system 14 includes a computer platform 48 having at least one processor 50 and a memory 52. The memory 52 includes a location integration module 54 that is operable to determine an integrated wireless device location. The location integration module 54 includes a protocol handler 56 operable to receive a request for wireless device location from the wireless device 12 and obtain, from the request, location measurement information associated with one or more wireless network edge devices and/or GNSS satellite signals.

The location integration module 54 additionally includes a location determiner 58 that includes at least one wireless network location determination routine 60 and at least one GNSS location determination routine 62. The wireless network location determination routine 60 is operable to determine a wireless device location based on the location measurement information associated with the wireless network edge devices and wireless network location assistance information 64 stored in database 18. The GNSS location determination routine 62 is operable to determine a GNSS-based wireless device location based on the location measurement information associated with the GNSS satellites and GNSS-based location assistance information 66 stored in database 18.

The location integration module 54 also includes location integrator 68 that is operable to integrate all of the determined wireless device locations, such as the wireless device locations and the GNSS-based wireless device location. The location integrator 68 may implement a predetermined integration method/routine to determine the overall integrated wireless device location. Integration routines may include, but are not limited to, averaging all of the determined locations, weighted averaging of all the determined locations, or defining an overlapping geometric area that encompasses two or more of the determined locations. In one implementation, once the integrated wireless device location is determined; the wireless device location may be communicated back to the wireless device 12.

Figure 2:
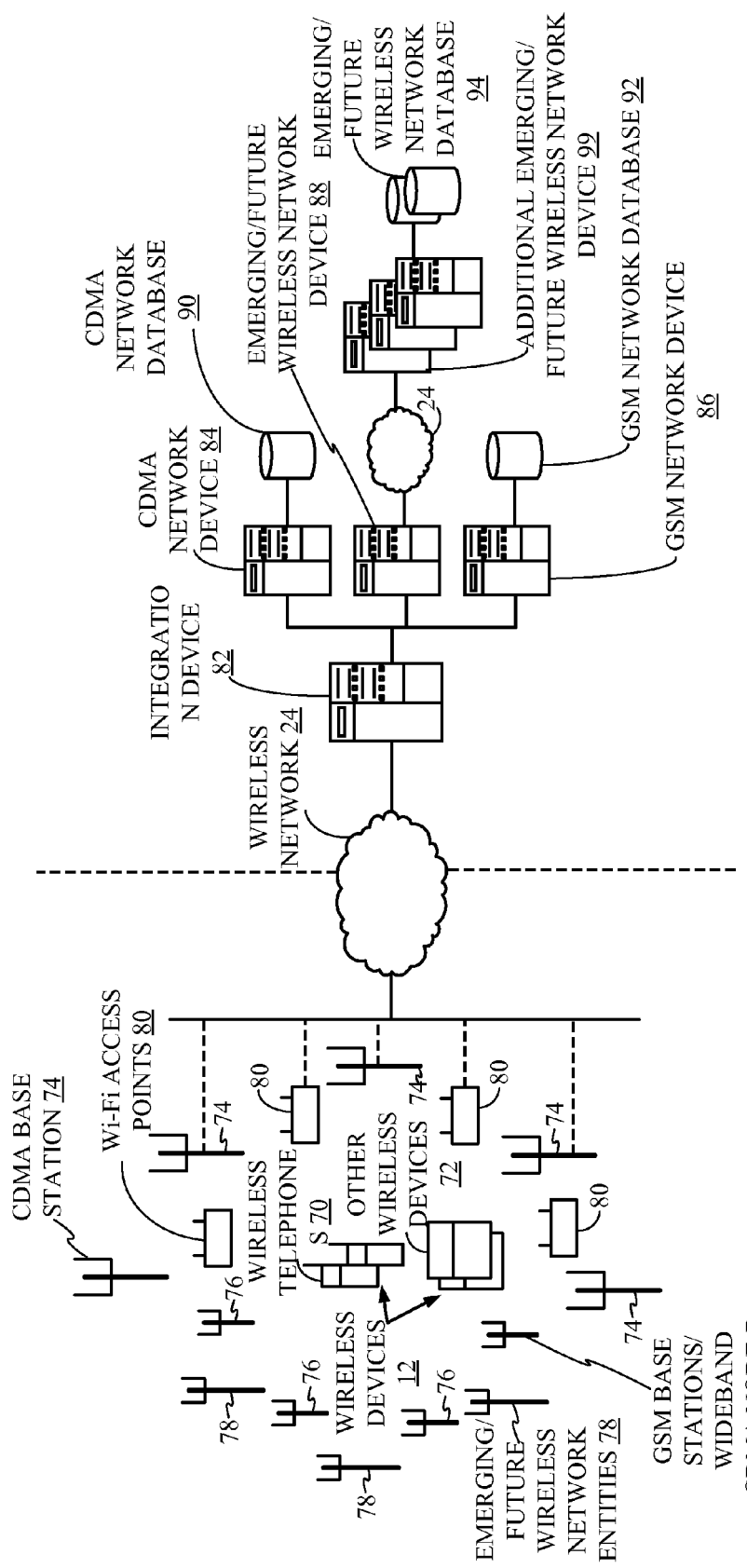
FIG. 2 is a block diagram of a system for integrating wireless device location determination, highlighting individual wireless network location determination, according to an aspect.

FIG. 2 is another block diagram of the system 10 for integrating wireless device location determination, according to another aspect. FIG. 2 provides emphasis on the wireless network location determination. The wireless device 12 may include wireless telephones 70, or other wireless devices 72, such as a PDA, portable computer or the like. The wireless devices 12 shown in FIG. 2 are configured to receive messages transmitted from CDMA base stations 74, GSM base stations/Wideband Code Division Multiple Access node-Bs 76, emerging/future wireless network entities 78 and Wi-Fi access points 80. The transmitted messages include location determining information, such as MAC address, SID, power measurements, RF characteristics, CDMA SID, base station ID, and frequency band.

As described in relation to FIG. 1, wireless device location integration may occur at the wireless device 12 or the wireless device location integration may occur at a network location integration system 14. Thus, the wireless device 12 may request an integrated location determination and communicate the location determination information from the received messages transmitted across wireless network 24.

In the illustrated aspect of FIG. 2, the network location integration system 14 includes an integration device 82 operable to integrate the wireless device location determinations. Additionally, the network location integration system 14 may include individual network devices for determining the wireless device location related to individual wireless networks. For example, the network location integration system 14 may include a CDMA network device 84 operable to determine CDMA network wireless device locations, a GSM network device 86 operable to determine GSM network wireless device locations and an emerging/future wireless network device 88 operable to determine emerging/future network wireless device locations. As such, the CDMA network device 84 may be in communication with CDMA network database 90 that is operable to provide CDMA location assistance information, the GSM network device 86 may be in communication with GSM network database 92 that is operable to provide GSM location assistance information and the emerging/future network device 88 may be in communication with emerging/future network database 94 via wireless network 24 and additional emerging/future network devices 96. Additionally, the CDMA network device 84, the GSM network device 86, and/or the emerging/future network device 88 may be configured to determine GNSS-based wireless device location. Once the individual wireless network locations are determined, the locations are communicated to the integration device 82 for overall integration and the result of the location integration is communicated to the wireless device 12.

Figure 3:
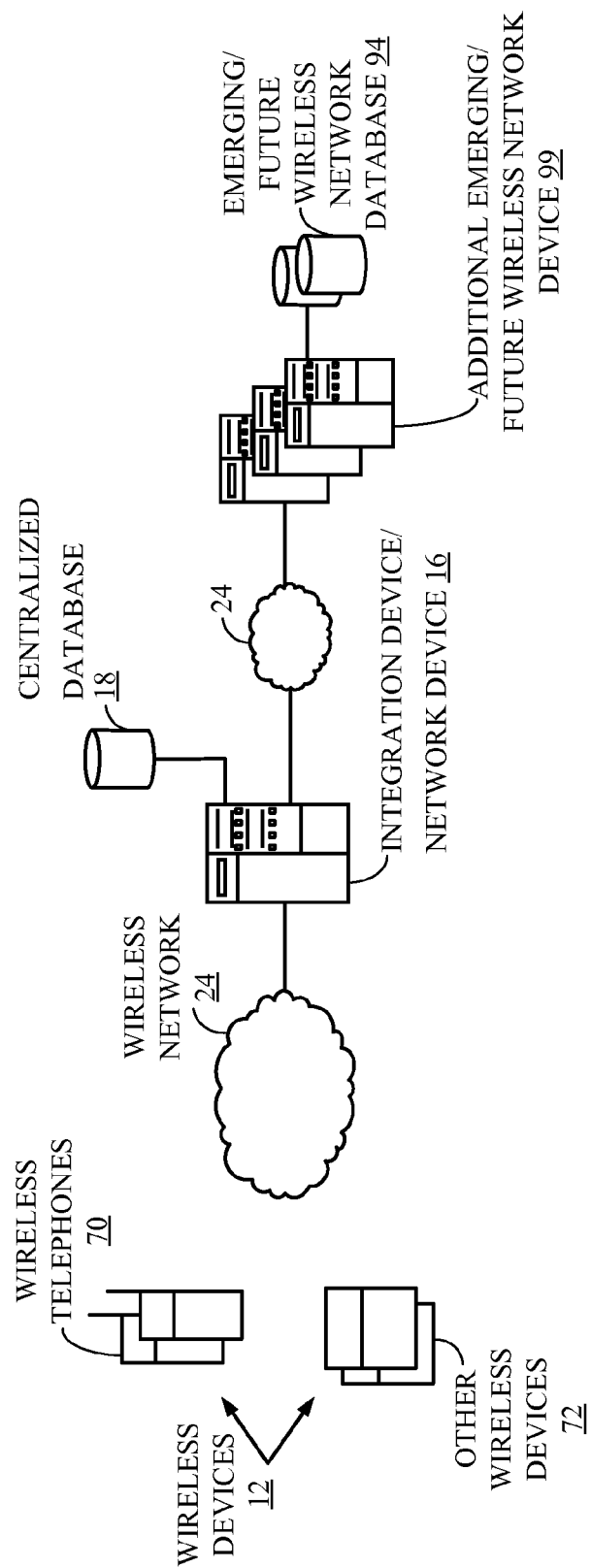
FIG. 3 is a block diagram of a system for integrating wireless device location determination, highlighting consolidated wireless network location determination, according to an aspect.

FIG. 3 is a block diagram of another aspect of the system 10 for integrating wireless device location determination, according to one implementation. The aspect of the system illustrated in FIG. 3 is consistent with the FIG. 1 aspect, in which location determination for each wireless network is implemented in the integration device/network device 16 and location assistance information for each network is stored at centralized database 18. In one implementation, the all-inclusive integration device/network device 16 can obviate the need for individual location determining devices, such as CDMA network device 84, GSM network device 86, and emerging/future network device 88. Additionally, the consolidated database 18 obviates the need for individual wireless network databases, such as CDMA network database 90 and GSM network database 92.

Figure 4A:
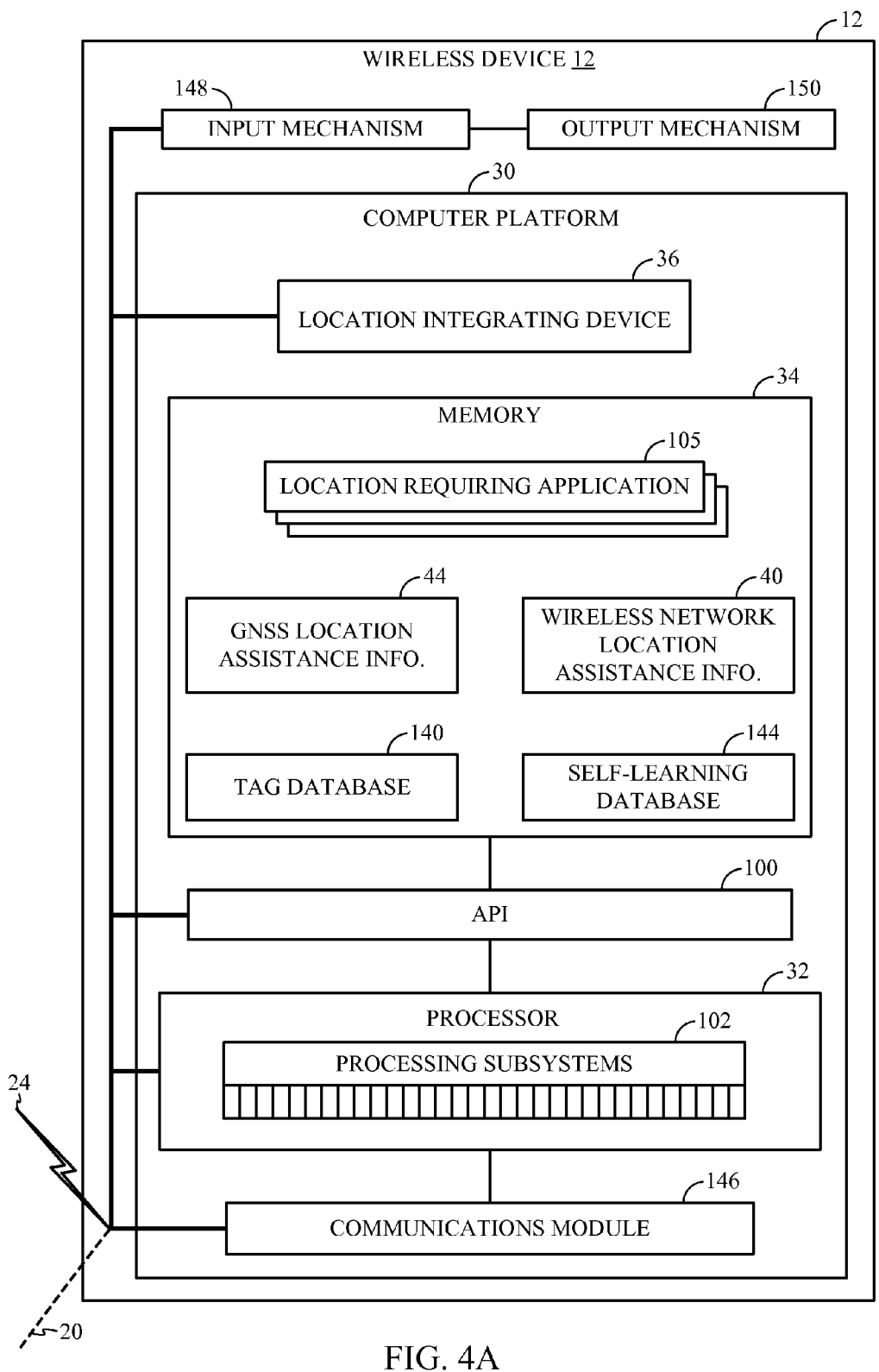
FIG. 4A is a detailed block diagram of wireless device configured for integrating wireless device location determination, according to an aspect.

Referring to FIG. 4A, according to one aspect, a more detailed block diagram representation of wireless device 12 is depicted. The wireless device 12 may include any type of computerized communication device, such as cellular telephone, PDA, two-way text pager, portable computer, a separate computer platform having a wireless communications portal which may further have a wired connection to a network or the Internet. The wireless device 12 can further be a remote-slave or other device that does not have an end-user thereof but simply communicates data across the wireless network, such as remote sensors, diagnostic tools, data relays, and the like. Thus, the present apparatus and methods for integrated wireless device location determination can accordingly be performed on any form of wireless communication device or wireless computer module, including a wireless communication portal, including without limitation, wireless modems, PCMCIA cards, access terminals, desktop computers or any combination or sub-combination thereof.

The wireless device 12 includes computer platform 30 that can transmit data across a wireless network, and that can receive and execute routines and applications. Computer platform 30 includes memory 34, which may comprise volatile and nonvolatile memory such as read-only and/or random-access memory (RAM and ROM), Erasable Programmable Read-Only Memory (EPROM), Electronically Erasable Programmable Read-Only Memory (EEPROM), flash cards, or any memory common to computer platforms. Further, memory 34 may include one or more flash memory cells, or may be any secondary or tertiary storage device, such as magnetic media, optical media, tape, or soft or hard disk.

Further, computer platform 30 also includes processor 32, which may be an application-specific integrated circuit ("ASIC"), or other chipset, processor, logic circuit, or other data processing device. Processor 32 or other processor such as ASIC may execute an application programming interface ("API") layer 100 that interfaces with any resident programs, stored in the memory 34 of the wireless device 12. In one or more of the present aspects, API 100 may interface with any component of the location integrating device, including, but not limited to, the wireless device location determiner 38, the GNSS location determiner 42 and the location integrator 46. In one example, API 100 is a runtime environment executing on the respective wireless device. One such runtime environment is Binary Runtime Environment for Wireless® (BREW®) software developed by Qualcomm Incorporated of San Diego, Calif. Other runtime environments may be utilized that, for example, operate to control the execution of applications on wireless computing devices.

Processor 32 includes various processing subsystems 102 embodied in hardware, firmware, software, and combinations thereof, that enable the functionality of wireless device 12 and the operability of the wireless device 12 on a wireless network 24. For example, processing subsystems 102 allow for initiating and maintaining communications, and exchanging data, with other networked devices. In one or more aspects in which the communication device is defined as a cellular telephone, the communications processor 32 may additionally include one or a combination of processing subsystems 102, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, Universal Subscriber Identity Module (USIM)/Universal Subscriber Identity (SIM), voice services, graphics, Universal Serial Bus (USB), multimedia such as Moving Picture Experts Group (MPEG), General Packet Radio Service (GPRS), etc (all of which are not individually depicted in FIG. 2 for the sake of clarity). For the disclosed aspects, processing subsystems 102 of processor 32 may include any subsystem components that can interact with the location integrating device 36. For example, RF tuner 104 may exist as the processing subsystems 102 or as a component of the location integrating device 36.

The location integrating device 36 of computer platform 30 is operable to integrate the various location determinations performed on the wireless device 12 and/or accessible to the wireless device 12. The location integrating device 36 is operable to receive location determination requests from location requesting applications 105 stored in memory 34, such as mapping applications or any other application that requires device location. Alternatively, the location integrating device 36 may receive location determination requests from the network via appropriate network communications.

Figure 4B:
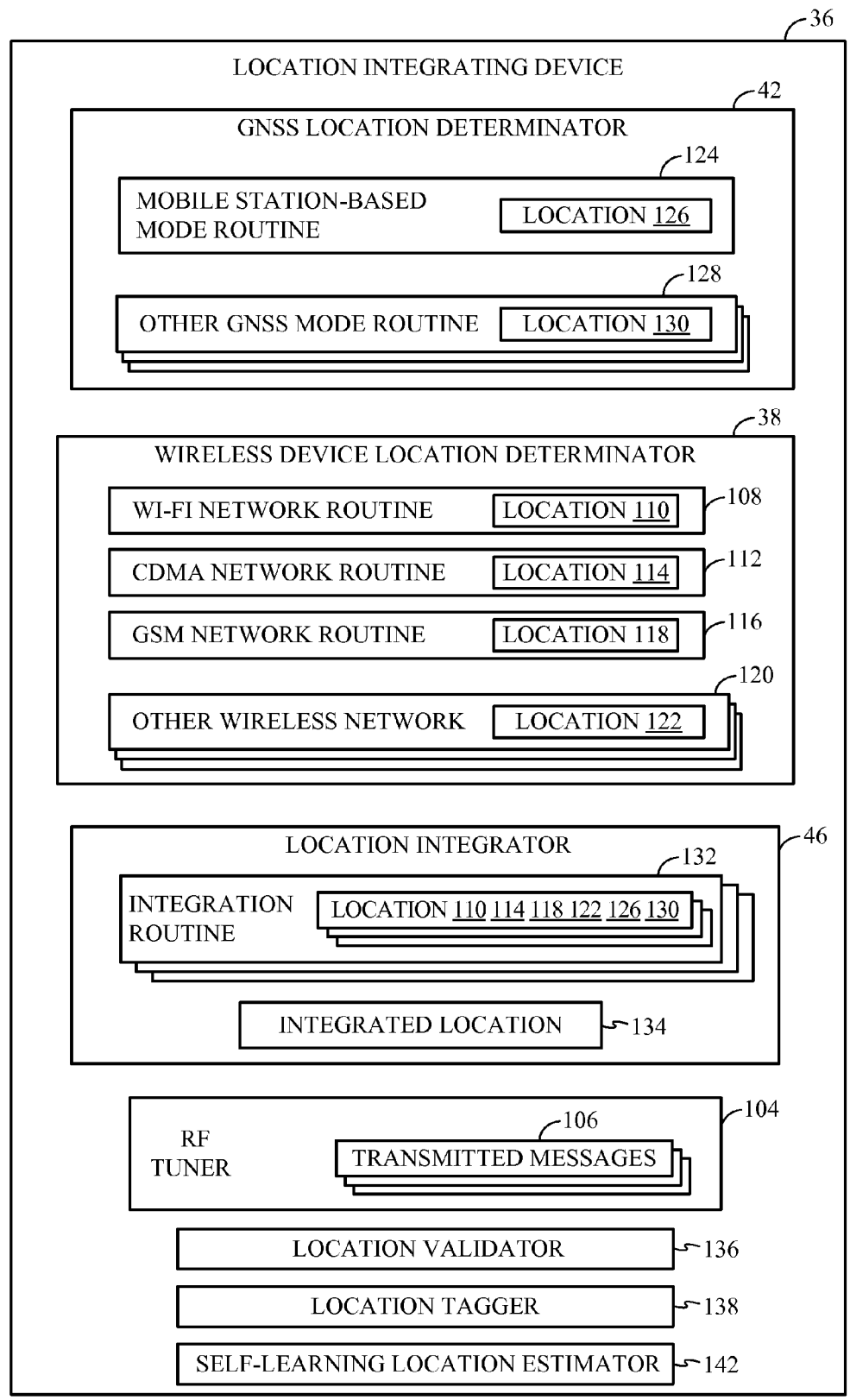
FIG. 4B is a detailed block diagram of a location integrating device included within a wireless device, according to an aspect.

Referring to FIG. 4B, a block diagram representation of the location integration device 36 of wireless device 12 is illustrated, according to an aspect. The location integrating device 36 includes a wireless network location determiner 38 that is operable to determine one or more wireless device locations. In this regard, wireless network location determiner 38 is operable to receive messages 106 transmitted from a plurality of wireless network edge devices. As such, the determiner 38 may in certain aspects, implement an RF tuner 104, such as an SDR to tune to receive all of the transmitted messages 106 transmitted from wireless network edge devices within the frequency range or ranges supported by the wireless device 12. The use of the RF tuner 104, such a SDR allows the wireless device 12 to implement only a portion of the protocol stack as the wireless device 12 passively listens (i.e., sniffs) for transmitted messages 106.

The wireless network location determiner 38 is additionally operable to obtain wireless network edge device location information from the transmitted messages. The wireless network edge device location information obtained from the messages may include, but is not limited to, the access point MAC address, the wireless network SID, the power measurements of the transmitted and received message, MMC device ID, RF characteristics, CDMA SID, base station ID, frequency band and the like. Additionally, the wireless network location determiner 38 is operable to obtain wireless network location assistance information for each of the wireless networks associated with the received messages. The wireless network assistance information 40 may be stored locally in memory 34 (shown in FIG. 4A) or the wireless network location determiner 38 may be required to communicate with a network entity to retrieve the requisite wireless network assistance information 40.

The wireless network location determiner 38 is also operable to determine a wireless device location or the "fix," based on the wireless network edge device location information and the wireless network location assistance information. For example, the wireless network location determiner 38 may implement Wi-Fi network routine 108 operable to determine a Wi-Fi or WiMAX network-based wireless device location 110, CDMA network routine 112 operable to determine a CDMA network-based wireless device location 114, GSM network routine 116 operable to determine a GSM network-based wireless device location 118, or an other wireless network routine 120, such as a routine for an emerging or future wireless network, operable to determine an other wireless device location 122. Additionally, the wireless network location determiner may implement a routine that combines measurement information from more than one wireless network to determine location.

The network based routines 108, 112, 116 and 120 may implement a network-based location determination mode, such as Advanced Forward Link Trilateration (AFLT), which determines location based on timing signals between network base stations. To determine location, the wireless device 12 obtains measurements from the messages of nearby network edge devices, such as cellular base stations (towers), access points or the like, and determines a distance based on transmit/receipt power measurements or transmit/receipt timing information. The distances are then used to triangulate an approximate location of the wireless device. In one example, at least three surrounding network edge devices are required to get an optimal position fix.

The location integrating device 36 additionally includes a GNSS location determiner 42 that is operable to determine a GNSS-based wireless device location. In this regard, the GNSS location determiner is operable to receive satellite signals 20 transmitted from GNSS satellites 20 and obtain GNSS location measurement information from the satellite signals. Additionally, the GNSS location determiner is operable to obtain GNSS location determining assistance information. Depending on the mode of GNSS location determination, the GNSS location determiner 42 may obtain the GNSS-based assistance information 44 locally from memory 34 or the GNSS-based location determiner 42 may be required to communicate with a network entity to retrieve the requisite GNSS-based assistance information 44. The GNSS location determiner 42 is additionally operable to determine a GNSS-based wireless device location based on the GNSS location measurement information and the GNSS-based assistance information 44.

As such, the GNSS location determiner 42 may include a Mobile Station (MS)-Based Mode Routine 124 operable to determine a GNSS-based wireless device location 126. MS-based mode location determination is characterized in that calculation of the device location occurs at the wireless device. In one example, while GNSS location assistance information 44 (shown in FIG. 4A) (e.g., ephemeris data, almanac data, etc.) is required to determine the location, each location determination attempt may not require communication with the network if the location assistance information is current enough to determine location. If the wireless device requires updating of the GNSS location assistance information 44, the wireless device communicates through the wireless network with the Position Determining Entity (PDE) to obtain current ephemeris data and/or almanac data. Once the wireless device has verified or obtained location assistance information 44, the wireless device uses the location assistance information 44 to set the parameters for receiving the GNSS signals 20 and, subsequently receives the timing signals transmitted from the GPS satellites 22. Once the GPS signals are received, the wireless device decodes the signals using the location assistance information 44 to aid in setting the decode parameters. The wireless device then uses the decoded timing information and executes a location determination function to determine device location.

The GNSS location determiner 42 may additionally include other GNSS mode routines 128 operable to determine a GNSS-based wireless device location 130. Examples of other mode routines 128 include, but are not limited to MS-assisted mode, Standalone mode and the like. MS-Assisted mode location determination is characterized in that calculation of the device location occurs at the network device (i.e., PDE) and, as such, communication with the network device may be required for each location determination attempt that uses MS-Assisted mode. Standalone mode is characterized in that calculation of the device location occurs at the wireless device and no location assistance information may be required to determine location.

The location integrating device 36 additionally includes a location integrator 46 that is operable to integrate all of the determined wireless device locations, such as the wireless device locations 110, 114, 118, and 122 and the GNSS-based wireless device location 126 and 130. The location integrator 46 may implement a predetermined integration method/routine 132 to determine the overall integrated wireless device location 134. Integration routines may include, but are not limited to, averaging all the determined locations, weighted averaging of all the determined locations, or defining an overlapping geometric area that encompasses two or more of the determined locations. In one example, weighted averaging method may provide higher weights to more accurate or more reliable location determination method to determine the integrated location of the wireless device. Alternatively, weighted averaging method may provide lower weights to less accurate or less reliable location determination method to determine the integrated location of the wireless device."

The location integrating device 36 may additionally include a location validator 136 operable to validate the determined integrated wireless device location 134. In certain aspects, validation may include comparing the integrated wireless device location 134 to a natural structure database, such as a topographical database and/or a man-made structure database, such as an urban landmark/building database, to insure altitude uncertainties of the integrated location. If the comparison determines that uncertainties exist between the determined integrated location and the databases, an appropriate correction/adjustment to the integrated location may be accomplished or the uncertainty may be presented to the requesting application 105 or the device user. In some instances, the natural structure database and/or man-made structure databases are network-based databases that may require the wireless device 12 to communicate with the wireless network 24 for validation purposes. However, it is within the bounds of the described aspects to include these databases or a portion of the databases within the memory 34 of wireless device 12.

The location integrating device 36 may further include a location tagger 138 operable to tag the determined integrated wireless device location 134 and store the tagged location in an appropriate database. The tag database 140 may be a local database within memory 34 and/or the tag database may be a network-based database that requires wireless network communication with the network database. Additionally tagged locations may be shared with third-party location determining entities in order to build their respective database of location-related data.

The location integrating device 36 may further include a self-learning location estimator 142 operable to estimate (i.e., self-learn) the location of network edge devices based on the integrated wireless device location 134 and location measurement information associated with the respective network edge device. Estimated wireless network edge device locations are subsequently stored in an appropriate self-learning database. The self-learning database 144 may be a local database within memory 34 and/or the self-learning database may be a network-based database that requires wireless network communication with the network database. Additionally estimated locations of network edge devices may be shared with third-party location determining entities in order to build their respective database of location-related data. In this regard, the self-learning location estimator 142 can refine the estimated location continually so as to increase the accuracy of the estimated location each time the network edge device is relied upon for a location fix. This aspect provides for efficiency in the overall integration process as the estimated location of the network edge devices may subsequently be relied upon in the location determination process.

Referring again to FIG. 4A, the computer platform 30 of wireless device 12 additionally includes communications module 146 embodied in hardware, firmware, software, and/or combinations thereof, that enables communications among the various components of the wireless communication device 12, as well as between the wireless device 12 and wireless network 24. In one or more of the described aspects, the communications module 146 enables receipt of location determination requests, transmission of integrated location determination results, such as tagged locations, requisite validation database communication, and transmission of self-learned estimate network edge device locations. The communications module 146 may include the requisite hardware, firmware, software, and/or combinations thereof for establishing a wireless network communication connection.

Additionally, wireless device 12 has input mechanism 148 for generating inputs into communication device, and output mechanism 150 for generating information for consumption by the user of the communication device. For example, input mechanism 148 may include a mechanism such as a key or keyboard, a mouse, a touch-screen display, a microphone, etc. In certain aspects, the input mechanisms 148 provide for user input to interface with an application, such as location requesting application 105. Further, for example, output mechanism 150 may include a display, an audio speaker, a haptic feedback mechanism, etc. In one or more of the illustrated aspects, the output mechanism 150 may include a display operable to display the integrated wireless device location 134.

Figure 5A:
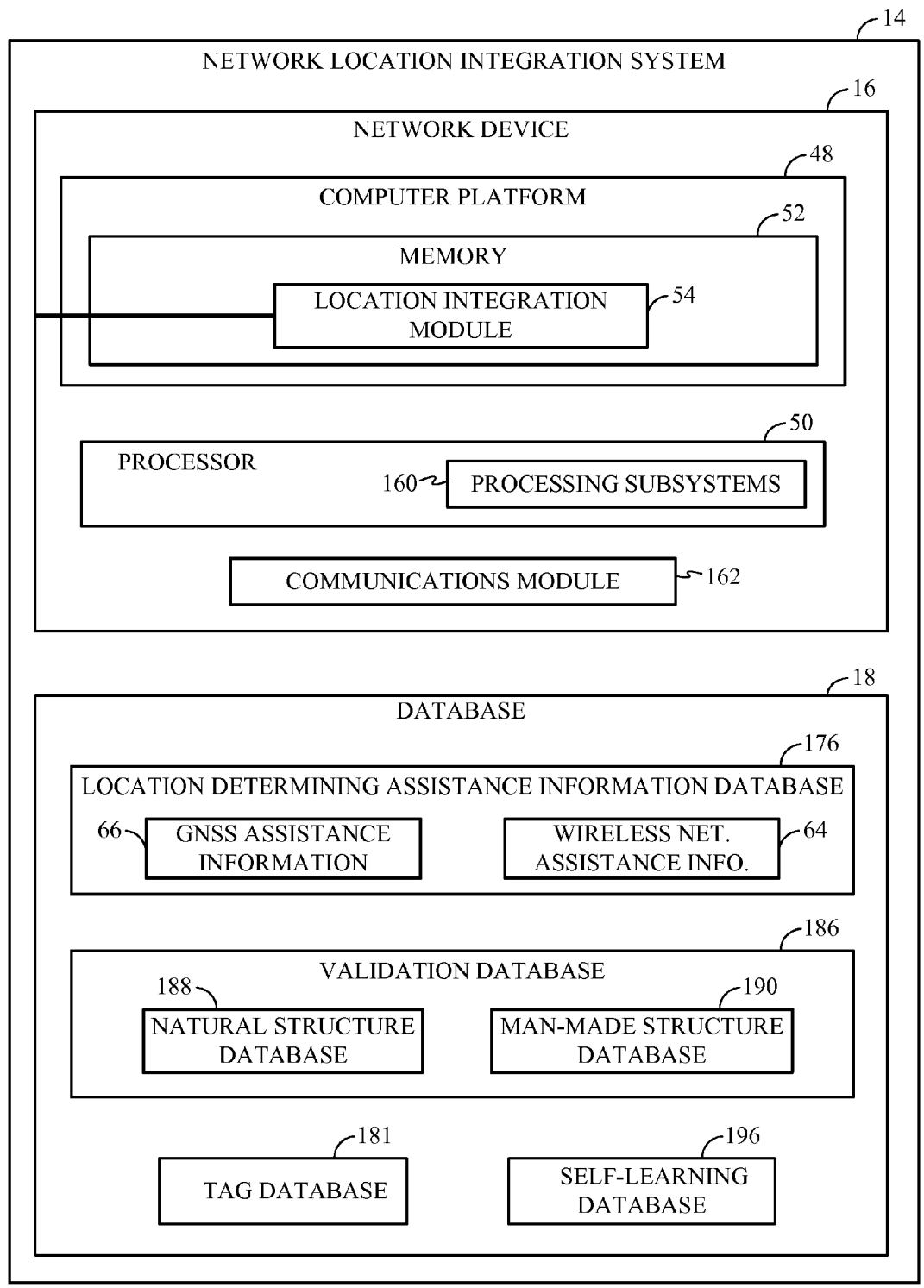
FIG. 5A is a detailed block diagram of a network location integration system, according to an aspect.

Referring to FIG. 5A, according to another aspect, a more detailed block diagram of a network location integration system 14 operable for integrating wireless device location integration is illustrated. The system 14 includes network device 16 and database 18, and may comprise at least one of any type of hardware, server, personal computer, mini computer, mainframe computer, or any computing device either special purpose or general computing device. Further, the modules and applications described herein as being operated on or executed by the network device 16 may be executed entirely on the network device 16. Alternatively, in another aspect, separate servers or computer devices may work in concert to provide data in usable formats to parties, and/or to provide a separate layer of control in the data flow between the wireless device 12 and the modules and applications executed by network device 16.

The network device 16 includes computer platform 48 that can transmit and receive data across wireless network 24, and execute routines and applications. Computer platform 48 includes a memory 52, which may comprise volatile and nonvolatile memory such as RAM and/or ROM, EPROM, EEPROM, flash cards, or any memory common to computer platforms. Further, memory 52 may include one or more flash memory cells, or may be any secondary or tertiary storage device, such as magnetic media, optical media, tape, or soft or hard disk.

Further, computer platform 48 also includes a processor 50, which may be an ASIC, or other chipset, logic circuit, or other data processing device. Processor 50 includes various processing subsystems 160 embodied in hardware, firmware, software, or combinations thereof, and enables the functionality of network device 16 and the operability of the network device on a wireless network. For example, processing subsystems 160 allow for initiating and maintaining communications, and exchanging data, with other networked devices. For one or more of the disclosed aspects, processing subsystems 160 of processor 50 may include any subsystem components that interact with the location integration module 54.

The computer platform 48 further includes a communications module 162 embodied in hardware, firmware, software, and/or combinations thereof, that enables communications among the various components of network device 16, as well as between the network device 16, and wireless devices 12. The communications module 160 may include the requisite hardware, firmware, software, and/or combinations thereof for establishing a wireless communication connection. The communication module 162 is operable to receive location determination requests from wireless device 12 and communicate the results of the integrated wireless device location determination to the requesting wireless device 12.

Figure 5B:
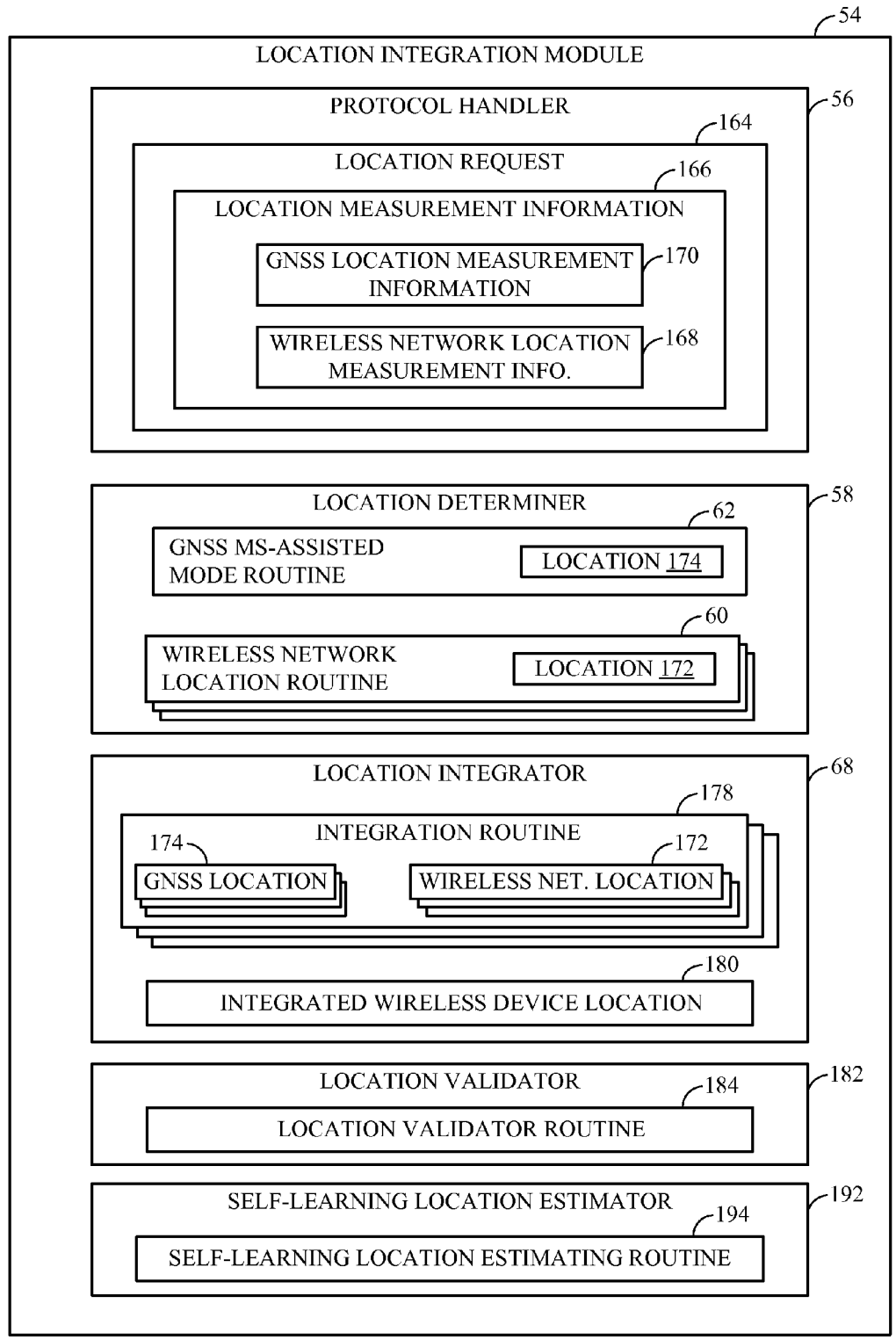
FIG. 5B is a detailed block diagram of a location integration module included within a network location integration system, according to another aspect.

Referring to FIG. 5B, a block diagram of the location integration module 54 is illustrated, according to an aspect. The location integration module 54 is operable to determine an integrated wireless device location. The location integration module 54 includes a protocol handler 56 operable to receive a location request 164 for wireless device location from the wireless device 12. The protocol handler 56 is further operable to obtain, from the request, location measurement information 166, such as wireless network location measurement information 168 associated with one or more wireless network edge devices and/or GNSS location measurement information 170 associated with the GNSS satellite signals. The wireless network edge device location measurement information 168 obtained form the messages may include, but is not limited to, the MAC address, the SID, the power measurements of the transmitted and received message, MMC device ID, RF characteristics, CDMA SID, base station ID, frequency band, and the like. The GNSS location measurement information 170 may include, but is not limited to, timing information related to the received satellite signals.

The location integration module 54 additionally includes a location determiner 58 that includes at least one wireless network location routine 60 and at least one GNSS MS-assisted mode routine 62. The wireless network location routine 60 is operable to determine a wireless device location based on the location measurement information associated with the wireless network edge devices and wireless network location assistance information 64 (shown in FIG. 5A) stored in location determining assistance information database 176 (shown in FIG. 5A) of database 18 (shown in FIG. 5A). For example, the wireless network location routine 60 may comprise a Wi-Fi network routine, CDMA network routine, GSM network routine, or another wireless network routine, such as a routine for an emerging or future wireless network. Additionally, the wireless network location determiner may implement a routine that combines measurement information from more than one wireless network to determine location. The wireless network location determination routine is operable to determine a wireless device location 172. The wireless network location routine 60 may implement a network-based location determination mode, such as AFLT, which determines location based on timing signals between network base stations.

The GNSS location determination routine 62 is operable to determine a GNSS-based wireless device location based on the location measurement information associated with the GNSS satellites and GNSS-based location assistance information 66 (shown in FIG. 5A) stored in location determining assistance information database 176 (shown in FIG. 5A) of database 18 (shown in FIG. 5A). In one aspect, the GNSS location determination routine may implement MS-assisted mode location determination. MS-Assisted mode location determination is characterized in that calculation of the device location occurs at the network level, such as a PDE, which may be network device 16, or any other network entity. As such, in one example, communication between the wireless device and network entity is required for each location determination attempt that uses MS-assisted mode. If the wireless device requires updating of the GNSS location determining assistance information, the wireless device communicates through the wireless network with the network device 16 to obtain current ephemeris data and/or almanac data stored in the GNSS location determining assistance information database 66. Once the wireless device has verified or obtained GNSS location determining assistance information 66, the wireless device uses the information 66 to set the parameters for receiving the GPS signals and, subsequently receives the timing signals transmitted from the GPS satellites. Once the GPS signals are received, the wireless device decodes the signals using the location determining assistance information 66 to aid in setting the decode parameters. The wireless device uses the decoded timing information to make measurements related to the distance from the GPS satellites and the wireless device communicates the measurement information to the network device. The network device 16 uses the measurement information and executes a location determining function to determine the location of the wireless device.

The location integration module 54 also includes location integrator 68 that is operable to integrate all the determined wireless device locations, such as the wireless device locations 172 and the GNSS-based wireless device location 174. The location integrator 68 may implement a predetermined integration method/routine 178 to determine the overall integrated wireless device location 180. Integration routines may include, but are not limited to, averaging all of the determined locations, weighted averaging of all the determined locations, or defining an overlapping geometric area that encompasses two or more of the determined locations. Once the integrated wireless device location is determined, it may be communicated back to the wireless device 12 or tagged and stored in tag database 181 (shown in FIG. 5A). Additionally tagged locations may be shared with third-party location determining entities in order to build their respective database of location-related data.

The location integration module 54 may additionally include a location validator 182 operable to implement a validation routine 184 to validate the determined integrated wireless device location 180. In one or more aspects, validation may include comparing the integrated wireless device location 180 to a validation database 186 (shown in FIG. 5A), such as natural structure database 188 (shown in FIG. 5A), such as a topographical database and/or a man-made structure database 190 (shown in FIG. 5A), such as an urban landmark/building database, to insure altitude uncertainties of the integrated location. If the comparison determines that uncertainties exist between the determined integrated location and the databases, an appropriate correction/adjustment to the integrated location may be accomplished or the uncertainty may be presented to the requesting application 105 or the device user.

The location integration module 54 may further include a self-learning location estimator 192 operable to execute a self-learning location estimating routine 194 to estimate (i.e., self-learn) the location of network edge devices based on the integrated wireless device location 180 and location measurement information associated with the respective network edge device. In addition, the self-learning location estimator may have access to measurement and edge device location estimates from numerous wireless devices, which further provide for greater refinement and accuracy of the overall edge device location estimate. Estimated wireless network edge device locations are subsequently stored in an appropriate self-learning database 196 (shown in FIG. 5A). Additionally estimated locations of network edge devices may be shared with third-party location determining entities in order to build their respective database of location-related data. In this regard, the self-learning location estimator 192 is able to refine the estimated location continually so as to increase the accuracy of the estimated network edge device location each time the network edge device is relied upon for a location fix. This aspect provides for efficiency in the overall integration process as the estimated location of the network edge devices may subsequently be relied upon in the location determination process.

Figure 6:
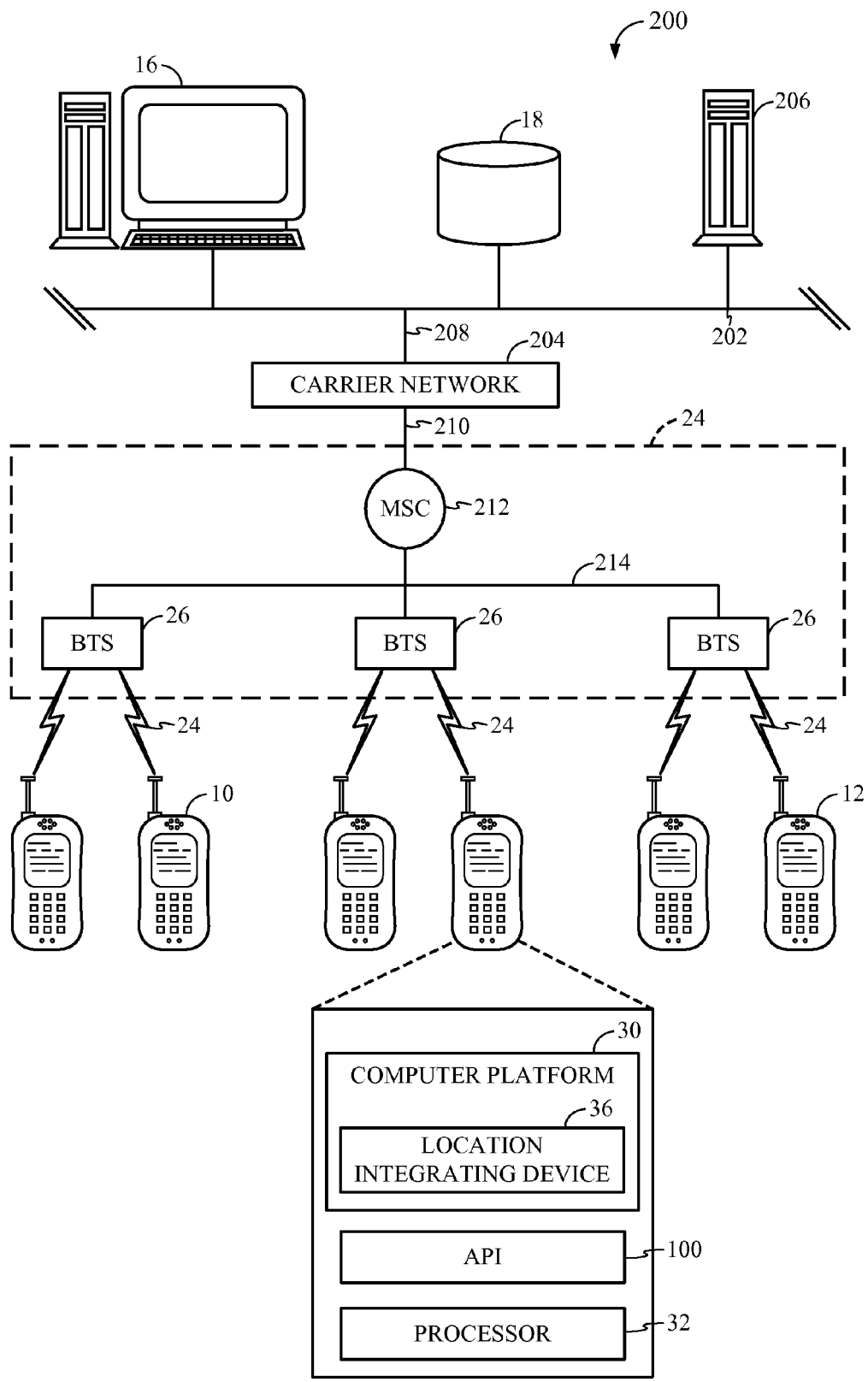
FIG. 6 is a block diagram of a cellular network implemented in conjunction with the wireless device, according to an aspect.

Referring to FIG. 6, in one aspect, wireless devices 12 are cellular telephones. A cellular telephone system 200 may include wireless network 24 connected to a wired network 202 via a carrier network 204. In one aspect, wireless devices 12 have increased computing capabilities and often can communicate packets including voice and data over wireless network 24. As described earlier, "smart" wireless devices 12 have APIs 100 resident on the devices' local computer platform 30 that allow software developers to create software applications that operate on the cellular telephone 12, and control certain functionality on the devices. FIG. 6 is a representative diagram that illustrates the components of a cellular wireless network and the interrelation of the elements of one aspect of the present system in more detail. Cellular wireless network 24 is merely exemplary and can include any system whereby remote modules, such as wireless devices 12 communicate over-the-air between and among each other and/or between and among components of a wireless network 24, including, without limitation, wireless network carriers and/or servers.

In system 200, network device 16 can be in communication over a wired network 202 (e.g. an LAN) with a separate data repository 18 for storing location determining assistance information, tagged location data, self-learned estimated locations and the like. Further, a data management server 206 may be in communication with network server 16 to provide post-processing capabilities, data flow control, etc. Network server 16, data repository 18 and data management server 206 may be present on the cellular telephone system 200 with any other network components that are needed to provide cellular telecommunication services. Network server 16, and/or data management server 18 communicate with carrier network 204 through data links 208 and 210 (e.g., Internet, a secure LAN, WAN, etc.). Carrier network 204 controls messages (e.g., data packets, etc.) sent to a mobile switching center ("MSC") 212. Further, carrier network 204 communicates with MSC 212 by a network 210, such as the Internet, and/or plain old telephone service ("POTS"). In the illustrated network 210, a network or Internet portion transfers data, and the POTS portion transfers voice information. MSC 212 may be connected to multiple base stations ("BTS") 26 by another network 214, such as a data network and/or Internet portion for data transfer and a POTS portion for voice information. BTS 26 ultimately transmits messages wirelessly to the wireless devices, such as wireless devices 12, by short messaging service ("SMS"), or other over-the-air methods.

Figure 7:
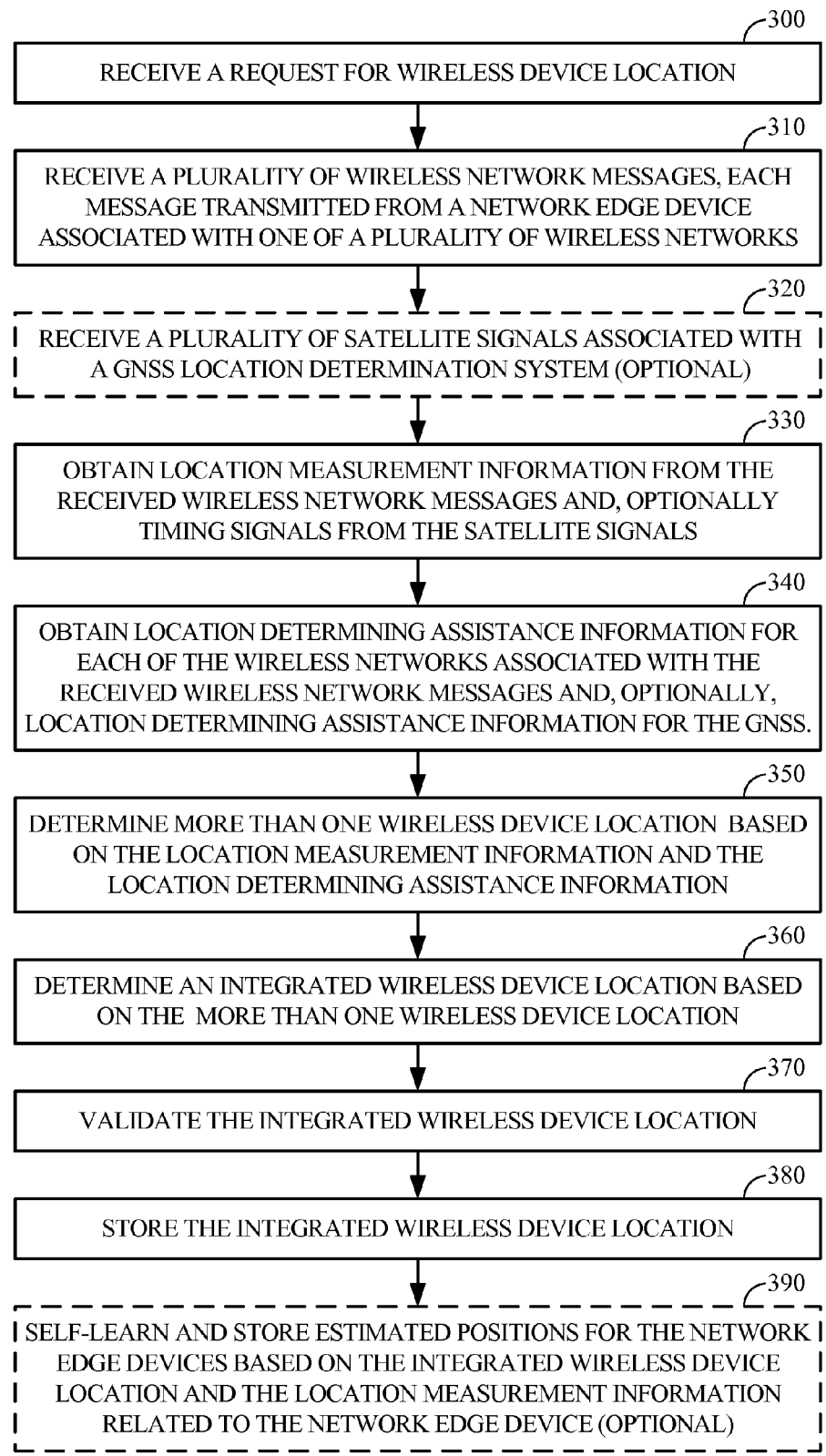
FIG. 7 is a flow diagram of a method for integrating wireless device location determination on the wireless device, according to an aspect.

FIG. 7 is a flow diagram of a method for integrating wireless device location determinations at a wireless device, in accordance to one implementation. At Event 300, the wireless device receives a request for wireless device location. The request may be initiated by a location-requesting application executable on the wireless device, such as mapping/tracking application or the like. Alternatively, the request may be received from the wireless network, such as a request from an emergency tracking entity or the like.

At Event 302, the wireless device receives a plurality of wireless network messages, each message transmitted from a network edge device associated with one of a plurality of wireless networks. In one aspect, the wireless device may be configured to passively listen (i.e., "sniff") for the wireless network messages transmitted from network edge devices that are within the frequency range or ranges supported by the wireless device. In this regard, the wireless device may implement an RF tuner, such as SDR that is capable of passively listening for all messages transmitted from the wireless network edge devices. Implementation of an RF tuner, such as SDR, provides for the wireless device to implement only the portion of the protocol stack to receive the requisite messages, thereby simplifying the overall location determination integration process. The wireless networks that the wireless device may receive messages from can include any known or future known wireless network, including, but not limited to, CDMA network, GSM network, Wi-Fi network, and the like.

Additionally, the received messages may be delivered from the serving networks (i.e., the active networks) and/or the surrounding networks (i.e., the non-attached networks). As referred to in the described aspects, the term "surrounding wireless networks" are defined as non-attached wireless networks from which the wireless device is capable of receiving wireless network messages and not non-attached wireless networks with which the wireless device can communicate. Conversely, the term "serving wireless network" is used herein to describe the active or attached wireless networks that are currently being used by the wireless device. For example, if the wireless device is currently communicating on the GSM communications network, GSM would be the serving network and all other wireless networks, for example CDMA communication network, Wi-Fi communication network or the like would be the surrounding wireless networks. In an alternate aspect, the wireless device may be actively communicating with more than one serving network. In the instances in which more than one serving network is active, one of the networks may be designated as the primary serving network, for example, the cellular network, and the other serving networks may be designated as the secondary serving networks.

At Event 320, the wireless device may optionally receive satellite signals from a plurality of GNSS satellites, such as GPS, GLONASS, Galileo satellites, or the like. In some instances, the wireless device may be located in areas that are unable to receive satellite signals, or the minimal satellite signals necessary to calculate a GNSS location. For example, the wireless device may be located indoors, or in dense urban area. In such a scenario, in one aspect, the integration method herein described may proceed without the need to determine a GNSS wireless device location.

At Event 330, the wireless device obtains location measurement information from the received wireless network messages. The location measurement information may include, but is not limited to, access point MAC address, wireless network SID, power measurements, MMC device ID, RF characteristics, CDMA SID, base station ID, frequency band and the like. Additionally, in the aspects in which a GNSS location is being determined, the wireless device may obtain timing information from the received GNSS satellite signals.

At Event 340, the wireless device obtains location determining assistance information for each of the wireless networks associated with the received wireless network messages. The location determining assistance information may include locations of other network edge devices in the network or any other information used to determine a network-based wireless device location. The location determining assistance information may be obtained from local wireless device memory or the wireless device may be required to communicate with a network database to retrieve the location determining assistance information. Additionally, in one or more aspects in which a GNSS location is determined, the wireless device may obtain GNSS location determining assistance information, such as ephemeris data and/or almanac data. Such data may be stored locally at the wireless device or may be retrieved from a network database.

At Event 350, the wireless device determines more than one wireless device location based on the location measurement information and the location determining assistance information. The wireless device may implement an AFLT routine to determine wireless device location or any other known or future known location determination routine. Additionally, the wireless device may implement a routine that combines measurement information from more than one wireless network to determine location. Also, in one or more aspects in which a GNSS location is determined, the wireless device may determine a GNSS-based wireless device based on the GNSS location measurement information and the location determining assistance information. The GNSS location determination may implement any known mode/routine of GNSS location determination, such as, but not limited to, MS-Based mode location determination, MS-Assisted mode location determination, Standalone mode location determination, and the like.

At Event 360, the wireless device determines an integrated wireless device location. Any predetermined integration method may be used, including, but not limited to, averaging all of the determined locations, weighted averaging the determined locations, and defining an overlapping area as the integration area for the determined locations. As such, the integrated wireless device location may take into account any wireless network fixes and any GNSS-based fixes.

At Event 370, the wireless device validates the integrated wireless device location. Validation may occur by comparing the integrated wireless device location to elevation databases, such as a natural structure database, for example, a topographical database and/or a man-made structure database, for example, an urban landmark/building database. Validation may serve to eliminate any uncertainties related to the elevation of the integrated wireless device location. If validation determines an uncertainty, the validation process may adjust the integrated location accordingly or report the uncertainty to the requesting application.

At optional Event 380, the wireless device may tag the integrated wireless device location and store the tagged location in a related database. The related database may be a local database on the wireless device or a network database. Additionally, the tagged location may be communicated to a third-party location determining database as a means of adding to the third party's database of location information.

At optional Event 390, the wireless device self-learns the estimated location of the network edge devices based on the integrated wireless device location and the location measurement information related to the network edge device. The estimated location of the network edge device may be stored in a self-learning database, which may be local or may require wireless communication to a network database. Additionally, the self-learned estimate location of network edge devices may be communicated to a third-party location determining database as a means of adding to the third party's database of location information. The self-learning aspect provides for the estimated network edge device location to be continually refined and adjusted to gain greater accuracy as subsequent location fixes rely on the network edge device for location determination.

Figure 8:
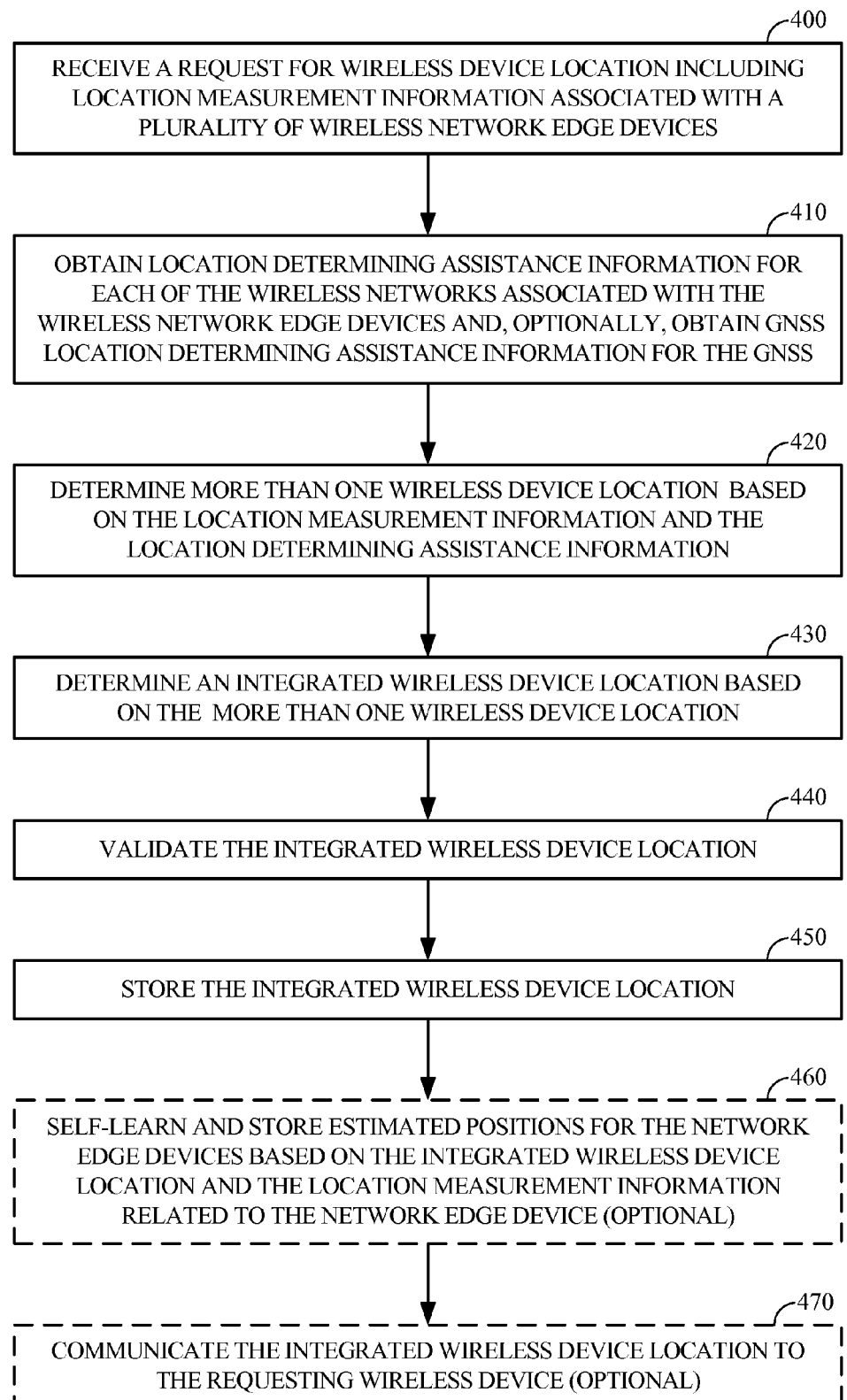
FIG. 8 is a flow diagram of a method for integrating wireless device location determination at a network device, according to an aspect.

FIG. 8 is a flow diagram of a method for integrating wireless device location determination at a network device, according to one aspect. At Event 400, the network device receives a request for wireless device location determination. The request includes wireless network location measurement information associated with a plurality of wireless network edge devices and, optionally, GNSS location measurement information. As previously noted, in one or more aspects, integrated location determination will be based on wireless network location determinations. In some other aspects, integrated location determination may be based on both wireless network location determinations and GNSS location determinations. According to one example, the requests can be received from the wireless device associated with the integrated location request. In another aspect, the requests may come from an intermediary network device or another wireless device.

At Event 410, the network device obtains location determining assistance information for each of the wireless networks associated with the wireless network edge devices. The location determining assistance information may include locations of other network edge devices in the network or any other information used to determine a network-based wireless device location. In one aspect, the location determining assistance information may be obtained from a network database. Additionally, in the aspects in which a GNSS location is determined, the wireless device may obtain GNSS location determining assistance information, such as ephemeris data and/or almanac data, which may be stored at a network database.

At Event 420, the network device determines more than one wireless device location based on the location measurement information and the location determining assistance information. The network device may implement an AFLT routine to determine wireless device location or any other known or future known location determination routine. Additionally, the wireless network location determiner may implement a routine that combines measurement information from more than one wireless network to determine location. In the one or more aspects in which a GNSS location is determined, the network device may determine a GNSS-based wireless device based on the GNSS location measurement information and the GNSS location determining assistance information. The GNSS location determination may implement any known mode/routine of GNSS location determination, such as, but not limited to, MS-Assisted mode location determination, and the like.

At Event 430, the network device determines an integrated wireless device location based on the wireless device locations for each wireless network and, optionally the GNSS-based wireless device location. Any predetermined integration method may be used, including, but not limited to, averaging all of the determined locations, weighted averaging the determined locations, and defining an overlapping area as the integration area for the determined locations. As such, the integrated wireless device location may take into account any wireless network fixes and any GNSS-based fixes.

At Event 440, the network validates the integrated wireless device location. Validation may occur by comparing the integrated wireless device location to elevation databases, such as a natural structure database (e.g., a topographical database, etc.) and/or a man-made structure database (e.g., an urban landmark/building database, etc.). Validation may serve to eliminate any uncertainties related to the elevation of the integrated wireless device location. If validation determines an uncertainty, the validation process may adjust the integrated location accordingly or report the uncertainty to the requesting application.

At optional Event 450, the network device may tag the integrated wireless device location and store the tagged location in a related database. The related database may be network database or a database stored at the wireless device. Additionally, the tagged location may be communicated to a third-party location determining database as a means of adding to the third party's database of location information.

At optional Event 460, the network device self-learns the estimated location of the network edge devices based on the integrated wireless device location and the location measurement information related to the network edge device. The estimated location of the network edge device may be stored in a self-learning database, which may be a network database. Additionally, the self-learned estimate location of network edge devices may be communicated to a third-party location determining database as a means of adding to the third party's database of location information.

At optional Event 470, the integrated wireless device location is communicated to the requesting wireless device and/or any other device requiring the wireless device's location.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or implementations, it should be noted that various changes and modifications could be made herein without departing from the scope of the described aspects and/or aspects as defined by the appended claims. Furthermore, although elements of the described aspects and/or embodiments may be described or claimed in the singular, the plural is contemplated unless limitation to the singular is explicitly stated. Additionally, all or a portion of any aspect and/or implementation may be utilized with all or a portion of any other aspect and/or implementation, unless stated otherwise.

Thus, present aspects provide for methods, devices, and systems for integrating wireless network location determination, such as Wi-Fi and the like, and Global Navigation Satellite System location determination, such as GPS and the like. While integration of the various location determination methods provides for more accurate location determination, the systems, methods, and apparatus herein disclosed also provide for location (i.e., position) to be determined in instances in which one or more of the location determination methods are unavailable. One or more of the aspects provide for a hardware-based solution that combines the GPS and Wi-Fi functionality on a wireless device semiconductor device to provide greater efficiency and speed in determining the integrated position. Additionally, efficiency is realized by providing for a self-learning system that estimates and continuously refines a location for wireless network edge devices, such as Wi-Fi access points and the like. Accuracy of the integrated location determination is provided for by a validation process that serves to eliminate altitude uncertainties from the resulting integrated location.

Many modifications and other aspects will come to mind to one skilled in the art to which the subject invention pertains having the benefit of the teachings presented in the foregoing descriptions and the associated drawings. Therefore, it is to be understood that the aspects are not to be limited to the specific aspects disclosed and that modifications and other aspects are intended to be included within the scope of the appended claims. Although specific terms are employed herein, the terms are used in a generic and descriptive sense only and not for purposes of limitation. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for determining location on a wireless communication device, comprising:
    receiving a request for wireless device location;
    receiving a plurality of wireless network messages, each message transmitted from a network edge device that is associated with one of a plurality of wireless networks;
    obtaining location measurement information from the received wireless network messages;
    obtaining location determining assistance information for each of the wireless networks associated with the received wireless network messages;
    determining more than one wireless device location based on the location measurement information and the location determining assistance information;
    determining an integrated wireless device location based on the more than one wireless device location;
    validating the integrated wireless device location; and
    storing the integrated wireless device location.

2. The method of claim 1, wherein receiving a plurality of wireless network messages further comprises passively listening to receive all messages transmitted from wireless network edge devices that are within a reception range of the wireless device and having a signal strength detectable by the wireless device.

3. The method of claim 2, wherein passively listening to receive all of the messages further comprises tuning a Software Defined Radio (SDR) to receive all wireless network messages transmitted from wireless network edge devices that are within a reception range of the wireless device.

4. The method of claim 1, wherein determining more than one wireless device location further comprises determining one or more wireless device location for one or more of the wireless networks associated with the received wireless network messages.

5. The method of claim 1, wherein determining more than one wireless device location further comprises determining one or more device locations by combining the location measurement information and the location determining assistance information from more than one wireless network.

6. The method of claim 1, wherein obtaining location measurement information from the received one or more wireless network messages further comprises obtaining location measurement information chosen from the group of information consisting of an access point Media Access Control (MAC) address, a wireless network System Identification (SID), power measurement information, radio frequency (RF) characteristics, a Code Division Multiple Access System Identification (CDMA SID), a base station ID, and frequency band.

7. The method of claim 1, wherein obtaining location determining assistance information further comprises accessing a database stored in a memory of the wireless device to obtain location determining information for at least one of the wireless networks associated with the received plurality of wireless network messages.

8. The method of claim 1, wherein obtaining location determining assistance information further comprises requesting location determining assistance information from a database stored in a memory of a device located across a wireless network from the wireless device and receiving the location determination assistance information in response to the request.

9. The method of claim 1, wherein determining an integrated wireless device location further comprises determining an integrated wireless device location based on at least one determination method chosen from the group consisting of averaging the wireless device locations, weighted averaging the wireless device locations, and defining an overlapping area for the wireless device locations.

10. The method of claim 1, wherein validating the integrated wireless device location further comprises comparing the integrated wireless device location to at least one of a group of a natural structure topology topography database and a man-made structure topology database.

11. The method of claim 1, further comprising receiving satellite signals associated with a Global Navigation Satellite System (GNSS), obtaining GNSS location determining information for the GNSS and determining a GNSS wireless device location based on the received satellite signals and the GNSS location determining information.

12. The method of claim 11, wherein determining an integrated wireless device location further comprises determining an integrated wireless device location based on at least one of the wireless device locations and the GNSS wireless device location.

13. The method of claim 1, wherein receiving the plurality of wireless network messages further comprises each message being transmitted from the respective surrounding network edge device that is associated with a respective one of a plurality of surrounding wireless networks.

14. The method of claim 1, wherein receiving the plurality of wireless network messages further comprises receiving a plurality of wireless network messages each message transmitted from a serving network edge device that is associated with a serving network.

15. The method of claim 1, wherein receiving the plurality of wireless network messages, further comprises receiving a plurality of wireless network messages each transmitted from a surrounding network edge device associated with one of a plurality of surrounding wireless networks and receiving a plurality of wireless network messages each message transmitted from a serving network edge device that is associated with a serving network.

16. The method of claim 13, wherein determining the integrated wireless device location further comprises determining based on surrounding network-based wireless device locations and serving network-based wireless device locations.

17. The method of claim 9, wherein receiving the plurality of wireless network messages further comprises receiving a plurality of wireless network messages transmitted from a surrounding network edge device each associated with one of a plurality of surrounding wireless networks and receiving a plurality of wireless network messages each message transmitted from a serving network edge device that is associated with a serving network.

18. The method of claim 15, wherein determining the integrated wireless device location further comprises determining based on at least two of the group of surrounding network-based wireless device locations, serving network-based wireless device locations and the GNSS wireless device location.

19. The method of claim 1, further comprising storing the integrated wireless device location as a tagged wireless device location.

20. The method of claim 1, further comprising storing an estimated location of at least one wireless network edge device based on the integrated wireless device location and the location measurement information associated with the at least one wireless network edge device.

21. The method of claim 1, further comprising communicating the integrated wireless device location to a network database.

22. At least one processor configured to determine location on a wireless communication device, comprising:
a first module for receiving a request for wireless device location;
a second module for receiving a plurality of wireless network messages, each message transmitted from a network edge device that is associated with one of a plurality of wireless networks;
a third module for obtaining location measurement information from the received wireless network messages;
a fourth module for obtaining location determining assistance information for each of the wireless networks associated with the received wireless network messages;
a fifth module for determining more than one wireless device location based on the location measurement information and the location determining assistance information;
a sixth module for determining an integrated wireless device location based on the more than one wireless device location;
a seventh module for validating the integrated wireless device location; and
an eighth module for storing the integrated wireless device location.

23. A computer program product, comprising:
a computer-readable medium comprising:
at least one instruction for causing a computer to receive a request for wireless device location;
at least one instruction for causing a computer to receive a plurality of wireless network messages, each message transmitted from a network edge device that is associated with one of a plurality of wireless networks;
at least one instruction for causing a computer to obtain location measurement information from the received wireless network messages;
at least one instruction for causing a computer to obtain location determining assistance information for each of the wireless networks associated with the received wireless network messages;
at least one instruction for causing a computer to determine more than one wireless device location based on the location measurement information and the location determining assistance information;
at least one instruction for causing a computer to determine an integrated wireless device location based on the more than one wireless device location;
at least one instruction for causing a computer to validate the integrated wireless device location; and
at least one instruction for storing the integrated wireless device location.

24. An apparatus, comprising:
means for receiving a request for wireless device location;
means for receiving a plurality of wireless network messages, each message transmitted from a network edge device that is associated with one of a plurality of wireless networks;
means for obtaining location measurement information from the received wireless network messages;
means for obtaining location determining assistance information for each of the wireless networks associated with the received wireless network messages;
means for determining more than one wireless device location based on the location measurement information and the location determining assistance information;
means for determining an integrated wireless device location based on the more than one wireless device location;
means for validating the integrated wireless device location; and
means for storing the integrated wireless device location.

25. A wireless device, comprising:
a computer platform including a processor and a memory;
a location integrating device executable by the processor and comprising:
a wireless network location determiner operable to receive wireless network messages from a plurality of wireless network edge devices, obtain wireless network edge device location measurement information from the wireless network messages, obtain wireless network location determining assistance information for each of the wireless networks associated with the received wireless network messages and determine one or more wireless device locations based on the wireless network location measurement information and the wireless network location determining assistance information;

a GNSS location determiner operable to receive satellite signals, obtain GNSS location measurement information from the satellite signals, obtain GNSS location determining assistance information and determine a GNSS-based wireless device location based on the GNSS location measurement information and the GNSS location determining assistance information; and a location integrator operable to determine an integrated wireless device location based one or more wireless device locations and the GNSS-based wireless device location.

26. The wireless device of claim 25, wherein the wireless network location determiner is further operable to passively listen to receive all messages transmitted from the plurality of wireless network edge devices that are within a reception range of the wireless device and having a signal strength detectable by the wireless device.

27. The wireless device of claim 25, wherein the location determining device further comprises an SDR operable to be tuned to receive all wireless network messages transmitted from the plurality of wireless network edge devices that are within a reception range of the wireless device.

28. The wireless device of claim 25, wherein the wireless network location determiner is further operable to determine the more than one wireless device location such that each wireless device location corresponds to one of the wireless networks associated with the received wireless network messages.

29. The wireless device of claim 25, wherein the wireless network location determiner is further operable to determine one or more of the wireless device locations by combining the location measurement information and the location determining assistance information from more than one wireless network.

30. The wireless device of claim 25, wherein the wireless network location determiner is further operable to obtain location measurement information from the received wireless network messages, wherein the location measurement information includes information chosen from the group consisting of a MAC address, an SID, power measurement information, RF characteristics, a CDMA SID, a base station ID, and frequency band.

31. The wireless device of claim 25, wherein the wireless network location determiner is further operable to access a database stored in a memory of the wireless device to obtain the wireless network location determining information.

32. The wireless device of claim 25, wherein the wireless network location determiner is further operable to request the location determining assistance information from a database stored in a memory of a device located across a wireless network from the wireless device and receive the location determination assistance information in response to the request.

33. The wireless device of claim 25, wherein the location integrator is further operable to determine an integrated wireless device location based on at least one determination method chosen from the group consisting of averaging the wireless device location, weighted averaging the wireless device location and defining an overlapping area for the wireless device locations.

34. The wireless device of claim 25, further comprising a location validator operable to validate the integrated wireless device location.

35. The wireless device of claim 34, wherein the location validator is further operable to compare the integrated wireless device location to at least one of a group of a natural structure topology database and a man-made structure topology database.

36. The wireless device of claim 25, wherein the a wireless network location determiner is further operable to receive wireless network messages from a plurality of surrounding network edge devices, obtain surrounding network edge device location measurement information from the wireless network messages, obtain surrounding network location determining assistance information for each surrounding network associated with the received wireless network messages and determine one or more wireless device locations based on the surrounding network location measurement information and the surrounding network location determining assistance information.

37. The wireless device of claim 35, wherein the location integrator is further operable to determine an integrated wireless device location based the wireless device locations and the GNSS-based wireless device location.

38. The wireless device of claim 25, wherein the wireless network location determiner is further operable to receive wireless network messages from a plurality of serving network edge devices, obtain serving network edge device location measurement information from the wireless network messages, obtain serving network location determining assistance information and determine one or more wireless device locations based on the serving network location measurement information and the serving network location determining assistance information.

39. The wireless device of claim 38, wherein the location integrator is further operable to determine an integrated wireless device location based the wireless device locations and the GNSS-based wireless device location.

40. The wireless device of claim 25, wherein the a wireless network location determiner is further operable to receive wireless network messages from a plurality of surrounding network edge devices and serving network edge devices, obtain surrounding network and serving network edge device location measurement information and from the wireless network messages, obtain serving network location determining assistance information and obtain surrounding network location determining assistance information for each surrounding network associated with the received wireless network messages and determine one or more wireless device locations based on the surrounding and serving network location measurement information and the surrounding and serving network location determining assistance information.

41. The wireless device of claim 40, wherein the location integrator is further operable to determine an integrated wireless device location based on the one or more wireless device locations and the GNSS-based wireless device location.

42. The wireless device of claim 25, wherein the memory further comprises a wireless device tagging database operable to receive and store the integrated wireless device location.

43. The wireless device of claim 25, wherein the location determining device further comprises a self-learning location estimator operable to estimate the location of one or more wireless network edge devices based on the integrated wireless device location and the location measurement information associated with the wireless network edge devices.

44. The wireless device of claim 25, wherein the memory further comprises a self-learning database operable to receive and store the estimated location of one or more wireless network edge devices.

45. The wireless device of claim 25, wherein the location determining device is operable to communicate the integrated wireless device location to a network database.

46. A method for determining wireless device location at a network device, comprising:
    receiving a request for wireless device location including location measurement information associated with a plurality of wireless network edge devices;
    obtaining location determining assistance information for each of the wireless networks associated with the wireless network edge devices;
    determining more than one wireless device location based on the location measurement information and the location determining assistance information;
    determining an integrated wireless device location based on the more than one wireless device location;
    validating the integrated wireless device location; and
    storing the integrated wireless device location.

47. The method of claim 46, wherein determining more than one wireless device location further comprises determining one or more wireless device location for one or more of the wireless networks.

48. The method of claim 46, wherein determining more than one wireless device location further comprises determining one or more device locations by combining the location measurement information and the location determining assistance information from more than one wireless network.

49. The method of claim 46, wherein receiving a request for wireless device location including location measurement information further comprises receiving a request for wireless device location including location measurement information that includes information chosen from the group of information consisting of a MAC address, an SID, power measurement information, RF characteristics, a CDMA SID, a base station ID, and frequency band.

50. The method of claim 46, wherein determining the integrated wireless device location further comprises determining based on at least one determination method chosen from the group consisting of averaging the wireless device locations, weighted averaging the wireless device locations and defining an overlapping area for the wireless device locations.

51. The method of claim 46, wherein validating the integrated wireless device location further comprises comparing the integrated wireless device location to at least one of a group of a natural structure topology database and a man-made structure topology database.

52. The method of claim 46, wherein receiving the request for wireless device location further comprises receiving a request for wireless device location including location measurement information associated with GNSS signals.

53. The method of claim 52, further comprising obtaining location determining assistance information for the GNSS and determining a GNSS wireless device location based on the GNSS satellite signals and the GNSS location determining information.

54. The method of claim 53, wherein determining the integrated wireless device location further comprises determining an integrated wireless device location based on the one or more wireless device locations and the GNSS wireless device location.

55. The method of claim 46, wherein receiving the request for wireless device location further comprises receiving a request for wireless device location including location measurement information associated with one or more surrounding network edge devices.

56. The method of claim 46, wherein receiving the request for wireless device location further comprises receiving a request for wireless device location including location measurement information associated with at least one of one or more serving network edge devices, one or more surrounding network edge devices, and one or more serving network edge devices and one or more surrounding network edge devices.

57. The method of claim 46, wherein storing the integrated wireless device location further comprises storing the integrated wireless device location as a tagged wireless device location.

58. The method of claim 46, further comprising determining an estimated location of one or more network edge devices based on the integrated wireless device location and the location measurement information associated with the wireless network edge devices.

59. The method of claim 58, wherein determining an estimated location of one or more network edge devices further combining location data from more than one wireless device.

60. At least one processor configured to determine wireless device location at a network device, comprising:
    a first module for receiving a request for wireless device location including location measurement information associated with a plurality of wireless network edge devices;
    a second module for obtaining location determining assistance information for each of the wireless networks associated with the wireless network edge devices;
    a third module for determining more than one wireless device location based on the location measurement information and the location determining assistance information;
    a fourth module for determining an integrated wireless device location based on the more than one wireless device location;
    a fifth module for validating the integrated wireless device location; and
    a sixth module for storing the integrated wireless device location.

61. A computer program product, comprising:
    a computer-readable medium comprising:
        at least one instruction for causing a computer to receive a request for wireless device location including location measurement information associated with a plurality of wireless network edge devices;
        at least one instruction for causing the computer to obtain location determining assistance information for each of the wireless networks associated with the wireless network edge devices;
        at least one instruction for causing the computer to determine more than one wireless device location based on the location measurement information and the location determining assistance information;
        at least one instruction for causing the computer to determine an integrated wireless device location based on the more than one wireless device location for each of the wireless networks;
        at least one instruction for causing the computer to validate the integrated wireless device location; and
        at least one instruction for causing the computer to store the integrated wireless device location.

62. An apparatus, comprising:
means for receiving a request for wireless device location including location measurement information associated with a plurality of wireless network edge devices;
means for obtaining location determining assistance information for each of the wireless networks associated with the wireless network edge devices;
means for determining more than one wireless device location based on the location measurement information and the location determining assistance information;
means for determining an integrated wireless device location based on the more than one wireless device location;
means for validating the integrated wireless device location; and
means for storing the integrated wireless device location.

63. A network location integration system, comprising:
a location determining assistance information database operable to store location determining assistance information associated with wireless networks and GNSSs; and
a network device including a computer platform having a processor and a memory, the device including:
a location integration module stored in the memory and executable by the processor, wherein the module includes:
a protocol handler operable to receive a request for wireless device location and obtain, from the request, location measurement information associated with one or more wireless network edge devices and GNSS satellite signals,
a location determiner operable to determine one or more wireless device location and a GNSS-based wireless device location based on the location measurement information and the location determining assistance information, and
a location integrator operable to determine an integrated wireless device location based on at least two of the one or more wireless device locations and the GNSS-based wireless device location.

64. The network device of claim 63, wherein the location determiner is further operable to determine a wireless device location for each of the wireless networks.

65. The network device of claim 63, wherein the location determiner is further operable to determine one or more device locations by combining the location measurement information and the location determining assistance information from more than one wireless network.

66. The network device of claim 63, wherein the protocol handler is further operable to obtain, from the request, location measurement information associated with a plurality of wireless network edge devices, wherein the information chosen from the group of information consisting of a MAC address, an SID, power measurement information, RF characteristics, a CDMA SID, a base station ID, and frequency band.

67. The network device of claim 63, wherein the location integrator is further operable to determine an integrated wireless device location based on at least one determination method chosen from the group consisting of averaging the wireless device location and the GNSS-based wireless device location, weighted averaging the wireless device location and the GNSS-based wireless device location and defining an overlapping area for the wireless device locations and the GNSS-based wireless device location.

68. The network device of claim 63, wherein the location integration module further comprises a location validator stored in the memory and executable by the processor wherein the location validation module is operable to validate the integrated wireless device location.

69. The network device of claim 68, wherein the location validator is further operable to compare the integrated wireless device location to at least one of a group of a natural structure topology database and a man-made structure topology database.

70. The network device of claim 63, wherein the protocol handler is further operable to receive a request for wireless device location and obtain, from the request, location measurement information associated with at least of one or more surrounding network edge devices and one or more serving network edge devices.

71. The network device of claim 70, wherein the location determining assistance information database is further operable to store location determining assistance information for one or more surrounding networks and one or more serving networks and the location determining module is further operable to determine a wireless device location based on the serving network edge device location measurement information and the location determining assistance information for the serving networks and one or more wireless device locations based on the surrounding network edge device location measurement information.

72. The network device of claim 70, wherein the location integrator is further operable to determine an integrated wireless device location based on at least two of the wireless device locations and the GNSS-based wireless device location.

73. The network device of claim 63, wherein the location integration module further comprises a self-learning location estimator stored in the memory and executable by the processor, wherein the self-learning location estimator is operable to estimate the location of one or more wireless network edge devices based on the integrated wireless device location and the location measurements associated with the wireless network edge devices and store the estimated location of the surrounding network edge devices in memory.

74. The network device of claim 63, further comprising a location database operable to store the integrated wireless device location as a tagged wireless device location.

75. The network device of claim 63, further comprising a communications module operable to communicate the integrated wireless device location to the requesting wireless device.

* * * * *